(12) United States Patent
Yamamoto et al.

(10) Patent No.: US 7,295,683 B2
(45) Date of Patent: Nov. 13, 2007

(54) LANE RECOGNIZING IMAGE PROCESSING SYSTEM

(75) Inventors: Takayuki Yamamoto, Tokyo (JP); Yoshiyuki Fujii, Tokyo (JP); Hisashi Ishikura, Tokyo (JP); Kenichi Fujie, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 593 days.

(21) Appl. No.: 10/839,247

(22) Filed: May 6, 2004

(65) Prior Publication Data

US 2005/0135658 A1    Jun. 23, 2005

(30) Foreign Application Priority Data

Dec. 17, 2003  (JP)  ............................. 2003-419976

(51) Int. Cl.
    *G06K 9/30*  (2006.01)
(52) U.S. Cl. ........................ 382/104; 340/438
(58) Field of Classification Search .................... None
    See application file for complete search history.

(56) References Cited

U.S. PATENT DOCUMENTS 5,835,028 A * 11/1998 Bender et al. .............. 340/937

2002/0041229 A1 * 4/2002 Satoh et al. ................ 340/438
2002/0081001 A1 * 6/2002 Tsuji ........................ 382/104
2004/0042638 A1 * 3/2004 Iwano ....................... 382/104

FOREIGN PATENT DOCUMENTS

JP    03-158976 A    7/1991
JP    09-113221 A    5/1997

* cited by examiner

*Primary Examiner*—Brian P. Werner
*Assistant Examiner*—Eueng-nan Yeh
(74) *Attorney, Agent, or Firm*—Sughrue Mion, PLLC

(57) ABSTRACT

A lane recognizing image processing system for recognizing lane markings laid on a driving road for motor vehicles includes a lane marking candidate point extraction means (20) for extracting lane marking candidate points (C) from an image (G) taken by an image pickup means (10) mounted on the motor vehicle, and a lane recognizing means (30) for recognizing a lane defined on the road on the basis of set of the lane marking candidate points (C). The lane recognizing means (30) includes a lane marking candidate point position converting means (31) for recognizing as lane marking candidate point positions the positions of the lane marking candidate points (C) transformed onto a straight line extending toward a null point.

8 Claims, 12 Drawing Sheets

FIG. 15 PRIOR ART
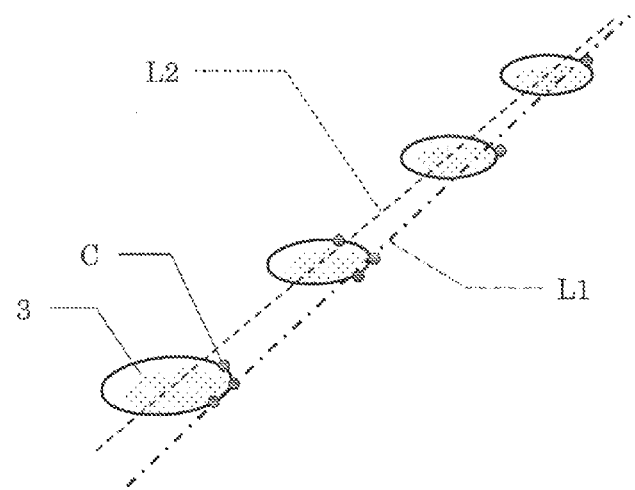
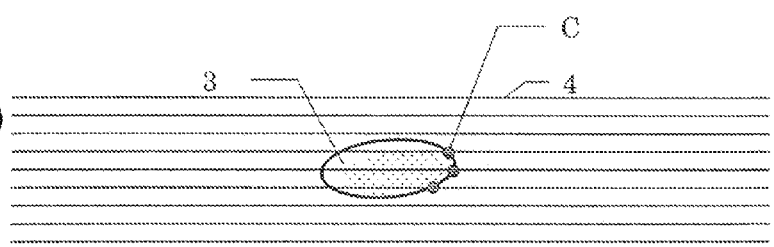
FIG. 16(a) PRIOR ART
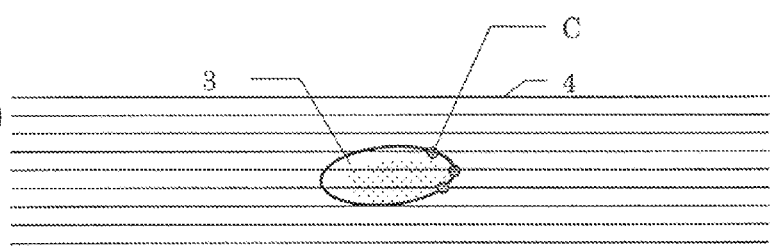
FIG. 16(b) PRIOR ART
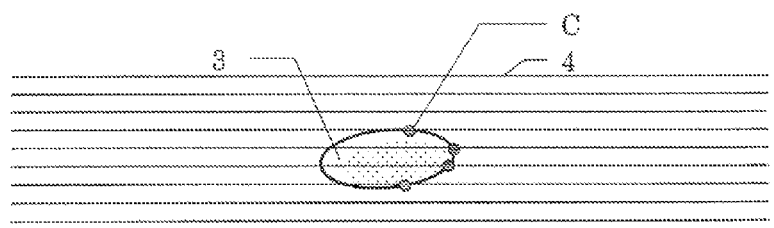
FIG. 16(c) PRIOR ART

LANE RECOGNIZING IMAGE PROCESSING SYSTEM

BACKGROUND OF THE INVENTION

1. Field of the Invention

The present invention generally relates to a lane recognizing image processing system for generating vehicle position information used in a motor vehicle control system such as typified by a lane keep system (LKS) or the like, which system is designed for ensuring precautionary safety for the operation of a motor vehicle by activating a lane departure warning system (LDWS) to thereby mitigate a burden otherwise imposed on the operator or driver of the motor vehicle.

2. Description of Related Art

In general, the object to be recognized by the lane recognizing image processing system is lane markings representing lane boundary lines which are applied or painted on a road in white or yellow. Of course, various forms of the lane markings are adopted in dependence on countries and/or localities. By way of example, in California in the United States of America, there exist freeways and prefectural or state roads on which linear arrays or rows of road rivets called Botts' dots, a sort of raised pavement markers, are laid.

The Botts' dots mentioned above (hereinafter also referred to as the dot when used in the singular) are realized each in the form of a circular rivet and are regularly laid on the road along the lane boundary lines. In driving a motor vehicle on the road on which the Botts' dots are laid, a reaction force applied to a steering mechanism of the motor vehicle or a sound generated when the rivet or the Botts' dot is ridden over is monitored by a control system.

In this conjunction, it is noted that when compared with the painted lane markings such as white lines and yellow lines, visibility of the Botts' dots lane markings is extremely poor because of low contrast between the Botts' dots lane markings and the road surface and because of discontinuity of the Botts' dots lane markings as viewed in the direction in which the motor vehicle is traveling, as a result of which not a little difficulty is encountered in the recognition of the lane by the image processing system.

Furthermore, in the case where the image recognition is performed by resorting to a same lane recognition algorithm as that for the ordinary lane marking recognition, there arises the necessity to discriminate the signals originating in the Botts' dots from noise for thereby separating the Botts' dot signal from the noise, which will incur increasingly in the load imposed on hardware and software designed for post-processing of the lane images picked-up.

Since the Botts' dots lane markings do not satisfy the conditions such as "continuity of the lane markings", and "high contrast relative to the road surface" which are prerequisites for many lane recognition algorithms, some measures must be taken for ensuring the robust recognition of high accuracy and high reliability.

Such being the circumstances, the hitherto known or conventional lane recognizing image processing system is provided with a driving environment arithmetic means for arithmetically determining the lane marking position on the basis of edges of the image and an inhibiting means for disabling or inhibiting the driving environment arithmetic means, wherein abnormality of the image is detected by comparing a quantity resulting from the processing of edges with a reference value to thereby inhibit operation of the driving environment arithmetic means when the abnormality is detected. For more particulars, reference may have to be made to e.g. Japanese Patent Application Laid-Open Publication No. 113221/1997 (also referred to as JP-A-1997-113221).

In the conventional lane recognizing image processing system such as disclosed in JP-A-1977-113221, erroneous lane marking recognition is evaded by inhibiting the lane marking recognition on the basis of the quantity obtained by the edge processing when the motor vehicle is traveling on the roads on which the Botts' dots are laid as the lane markings. Consequently, the lane recognizing image processing system is constantly set to the state incapable of recognizing the lane markings on the Botts' dots-laid road, giving rise to a problem.

Further, as another lane recognizing image processing system known heretofore, there has been proposed such a system which is so arranged as to convert or transform an original image into an edge image by differentiating the original image and performs the Hough conversion on the edge image to thereby extract a group of straight line segments approximating arrays of feature points of the image, wherein the straight lines corresponding to the lane markings are selected from the group of the approximate straight lines on the basis of the width of the road. For more particulars, reference may have to be made to e.g. Japanese Patent Application Laid-Open Publication No. 158976/1991 (also referred to as JP-A-1991-158976).

With the lane recognizing image processing system disclosed in JP-A-1991-158976, it is difficult to realize the lane recognition with reasonable accuracy for the group of straight lines composed of edge points of only one dot in the case where the dot is of a circular form whose contour line does not extend in parallel with the lane boundary line even if the Hough conversion of high noise insusceptibility is resorted to.

In the lane recognizing image processing system described in JP-A-1991-158976, decision processing is executed for identifying the sort or type of the lane markings (e.g. broken line) by detecting broken portions in the edge point row, which is however ineffective for the dots laid discontinuously.

In general, although the ordinary painted lane marking extends in parallel with the lane boundary line, the contours of the dots are not always in parallel with the lane boundary line. Accordingly, when the lane marking candidate point position is set on the contour line of the dot, the result of the lane recognition will indicate the lane extending in the direction deviated or departed from the actual lane boundary line.

In the following, problems which the conventional lane recognizing image processing systems suffer will be examined in the concrete by referring to FIGS. 15 16(*a*), 16(*b*) and 16(*c*) of the accompanying drawings.

FIG. 15 is a perspective view for illustrating relations among Botts' dots 3, an approximate straight line L1 which approximates the lane, a lane boundary line L2 and lane marking candidate points C and shows that the approximate straight line L1 deviates or fluctuates by a half of the width of the Botts' dot 3 in the cases where the lane marking candidate points C on the Botts' dots 3 laid on a road at the left-hand side thereof are located inside of the lane.

FIGS. 16(*a*), 16(*b*) and 16(*c*) are views for illustrating relations among the Botts' dot 3, lane marking search or scanning lines 4 and the lane marking candidate point C and shows that the position of the lane marking candidate point C becomes different in dependence on the positional relation between the lane marking candidate point C and the lane marking search lines 4 on the assumption that the lane marking candidate point C on the Botts' dot 3 laid on the road at the left-hand side thereof is located inside of the lane.

As can be seen in FIGS. 16(a), 16(b) and 16(c), even when a plurality of the lane marking candidate points C on the Botts' dot 3 are used, the position and the number of the lane marking candidate points C on the Botts' dot 3 change in dependence on the positional relation between the lane marking search/scan lines 4 and the Botts' dot 3 and the resolution in the longitudinal direction in the case where the lane marking candidate points C are set at the positions inside of the lane relative to the Botts' dot 3 laid on the left-hand side. As a consequence of this, the result of the lane recognition contains departure of a magnitude equivalent to a half of the transverse width of the Botts' dot (lane marking) 3, as is shown in FIG. 15.

For evading occurrence of such departure, it is known to convert or transform the positions of the lane marking candidate points C not on the contour line of the Botts' dots 3 but on a straight line extending toward the null point (i.e., point at which the Botts' dot 3 makes disappearance) in accordance with a predetermined rule.

Certainly, the conversion method to this end will be practically effective so long as the method can be realized with low load imposed on hardware and software upon execution of the conversion.

However, even if the practically effective conversion method is adopted for solving the problem mentioned previously, the result of the lane recognition may nevertheless depart from the actual lane boundary line L2 in dependence on the accuracy and resolution of the conversion method when the lane marking candidate point(s) C exists only on the single dot 3.

Accordingly, there arises the necessity of determining that the lane marking candidate point (s) C exists only on the single dot. In this conjunction, it is however to be mentioned in conjunction with the decision as to existence of the lane marking candidate point(s) C only on the single dot 3 that the decision will result in that the recognition is impossible even in the case where approximation with a straight line interconnecting two Botts' dots 3 is possible when the decision is made on the basis of only the number of the candidate points, giving rise to a problem.

The problem of the unrecognizableness described above can certainly be coped with by making a decision on the basis of the inter-point distance between two points in the set of candidate points in the traveling direction of the motor vehicle. However, it will increase the cost involved in the arithmetic operation to check all possible combinations of the inter-point distances.

Further, the threshold value for determining the inter-point distance between the two points has to be so set that existence of the lane marking candidate points on the single Botts' dot 3 can be determined without fail.

In the case where existence of the lane marking candidate point(s) C only on the single dot 3 is ascertained, reliability of the information derived from the lane marking candidate point C is low. Accordingly, some countermeasures will have to be taken.

As the countermeasures to this end, there can be mentioned a method of invalidating the information derived from the lane marking candidate point C. This method is however disadvantageous in that the result of the lane recognition can not be referenced even when only one given frame becomes invalid in the course of traveling on the Botts' dots-laid road. Further, when the lane marking search is performed with reference to the result of the lane recognition obtained precedingly, speedy restoration of the lane recognition will become difficult.

Besides, the invalidation method mentioned above suffers an additional problem that when the result of the preceding lane recognition is being delivered as the output data notwithstanding that the result of the preceding lane recognition is erroneous, the output data of the erroneous recognition can not be corrected until the result of the succeeding lane recognition not invalidated is made available.

More concretely, when the result of the lane recognition is invalidated, the result of the preceding lane recognition or result of the time-based average processing can certainly be delivered as the output data. In that case, however, the period for which the result of the preceding lane recognition is to be held needs to be so set that the real time performance and the reliability are not thereby impaired.

As is apparent from the above, the conventional lane recognizing image processing system suffers a problem that when the lane marking candidate point C is located inside of the lane relative to the Botts' dot 3, as shown in FIGS. 16(a), 16(b) and 16(c), incoincidence of the position and the number of the lane marking candidate points C occurs among the individual Botts' dots 3, as a result of which departure corresponding to a half of the dot width is involved in the result of the lane recognition, as shown in FIG. 15.

Further, even if the above-mentioned problem is solved by the practically effective conversion method mentioned previously, the result of the lane recognition may depart from the actual lane boundary line when the lane marking candidate point(s) C exists only on the single dot 3. Accordingly, there arises the necessity of making decision as to whether the lane marking candidate point (s) C exists only on the single dot. However, when this decision is made on the basis of only the number of the lane marking candidate point(s) C, the decision may result in that the recognition is impossible even if approximation with a straight line interconnecting the two dot points 3 is possible, giving rise to a problem.

The problem mentioned just above can certainly be coped with by making a decision on the basis of the inter-point distance between the two points in the candidate point sets in the traveling direction. However, this solution will incur increased cost in the arithmetic operation because all possible combinations of the inter-point distances have to be referenced.

Further, in the case where existence of the lane marking candidate only on the single dot 3 is made apparent, the information of low reliability derived from this lane marking candidate is invalidated. This method is however disadvantageous in that the result of the lane recognition can not be referenced even in the case where only one given frame is rendered invalid in the course of traveling on the Botts' dots-laid road.

Further, when the lane marking search is performed with reference to the result of the lane recognition obtained precedingly, difficulty is encountered in the speedy restoration of the lane recognition.

Besides, the invalidation method mentioned above suffers an additional problem that when the result of the preceding lane recognition is being delivered as the output data notwithstanding that the result of the preceding lane recognition is erroneous, the output data of the erroneous recognition can not be corrected until the result of the succeeding valid lane recognition becomes available.

SUMMARY OF THE INVENTION

In the light of the state of the art described above, it is an object of the present invention to provide a lane recognizing image processing system for recognizing the lane markings (Botts' dots or the like) peculiar to the districts or localities which system is capable of making available a robust result of lane recognition with high reliability by eliminating or excluding only the frame that involves erroneous recognition by taking into consideration that the contour of the dot is not in parallel with the lane.

More particularly, it is an object of the present invention to provide a lane recognizing image processing system which is improved in respect to the recognition reliability by adopting a method of setting an intermediate point in a widthwise direction of the lane marking as a lane marking candidate point position and invalidating the result of the lane recognition in the case where the lane marking candidate exists only on the single dot and which method can minimize load imposed on hardware and software incorporated in the lane recognizing image processing system.

In view of the above and other objects which will become apparent as the description proceeds, there is provided according to a general aspect of the present invention a lane recognizing image processing system installed on a motor vehicle, which system includes an image pickup means for picking up scenes appearing in front of the motor vehicle, a lane marking candidate point extraction means for extracting candidate points of lane markings from the image taken by the image pickup means as lane marking candidate points, and a lane recognizing means for recognizing on the basis of a set of the lane marking candidate points a lane on a road on which the motor vehicle is traveling.

The lane recognizing means includes a lane marking candidate point position converting means for converting the lane marking candidate points to lane marking candidate point positions.

The lane marking candidate point position converting means is so designed as to recognize as the lane marking candidate point positions the positions on a straight line extending in a direction toward a null point onto and along which the lane marking candidate points are converted.

With the arrangement of the lane recognizing image processing system according to the present invention described above, the result of the robust lane recognition assuring an enhanced reliability can be made available while mitigating load imposed on hardware and software even in the state where the motor vehicle equipped with the lane recognizing image processing system according to the present invention is traveling on a Botts' dots-laid road or the like.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 15 is a perspective view for illustrating a state in which an approximate straight line deviates by a half of the width of a Botts' dot when lane marking candidate points on the Botts' dots laid on a road at the left-hand side thereof are set inside of the lane in a conventional lane recognizing image processing system; and FIGS. 16(a), 16(b) and 16(c) are views for illustrating that the lane marking candidate point positions assume different statuses in dependence on positional relations between the Botts' dot and the lane marking search (scan) lines in the case where the lane marking candidate point position on the Botts' dot laid on the left-hand side of a road is located inside of the lane in the conventional lane recognizing image processing system.

DESCRIPTION OF THE PREFERRED EMBODIMENTS

Figure 1:
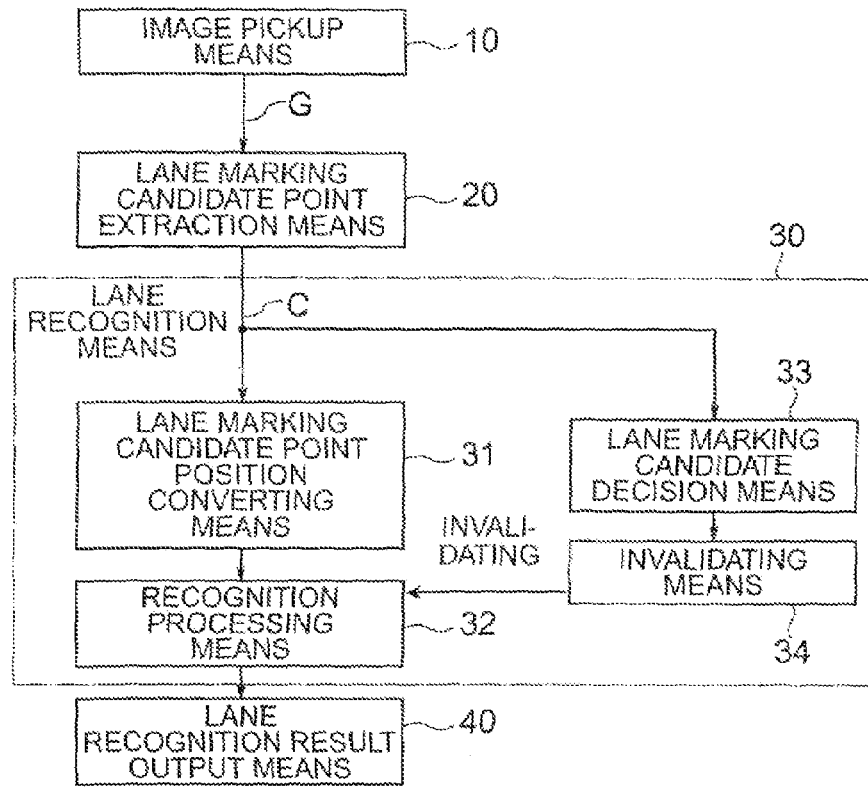
FIG. 1 is a block diagram showing schematically a functional configuration of a lane recognizing image processing system according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

Now, the lane recognizing image processing system according to a first embodiment of the present invention will be described by reference to the drawings.

Figure 2:
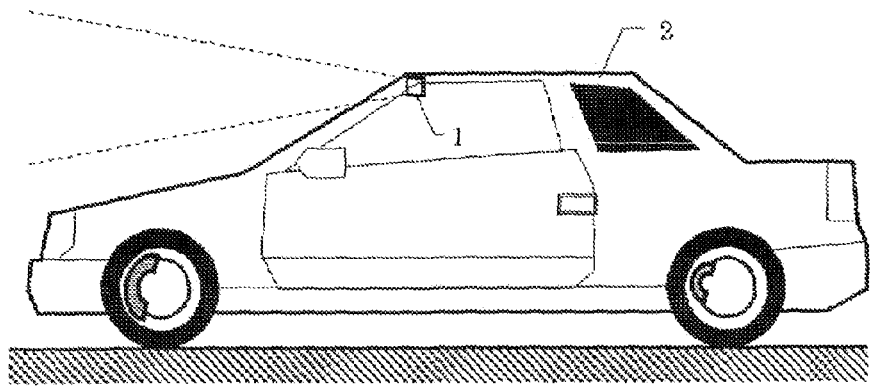
FIG. 2 is a view showing, by way of example, an outer appearance of a motor vehicle on which a camera (image pickup means) is installed.

FIG. 1 is a block diagram showing a functional configuration of the lane recognizing image processing system according to the first embodiment of the invention, and FIG. 2 is a view showing an outer appearance of a motor vehicle which is equipped with the lane recognizing image processing system.

As can be seen in FIG. 2, a camera 1 constituting a major part of an image pickup means is mounted on a motor vehicle 2 at a front top portion thereof for taking pictures or images of scenes which appear in front of the traveling motor vehicle 2.

Referring to FIG. 1, the lane recognizing image processing system is comprised of an image pickup means 10 including the camera 1 mentioned above, a lane marking candidate point extraction means 20, a lane recognition means 30 and a lane recognition result output means 40.

The lane recognition means 30 is in turn comprised of a lane marking candidate point position converting means 31, a recognition processing means 32, a lane marking candidate decision means 33 and an invalidating means 34.

Figure 3:
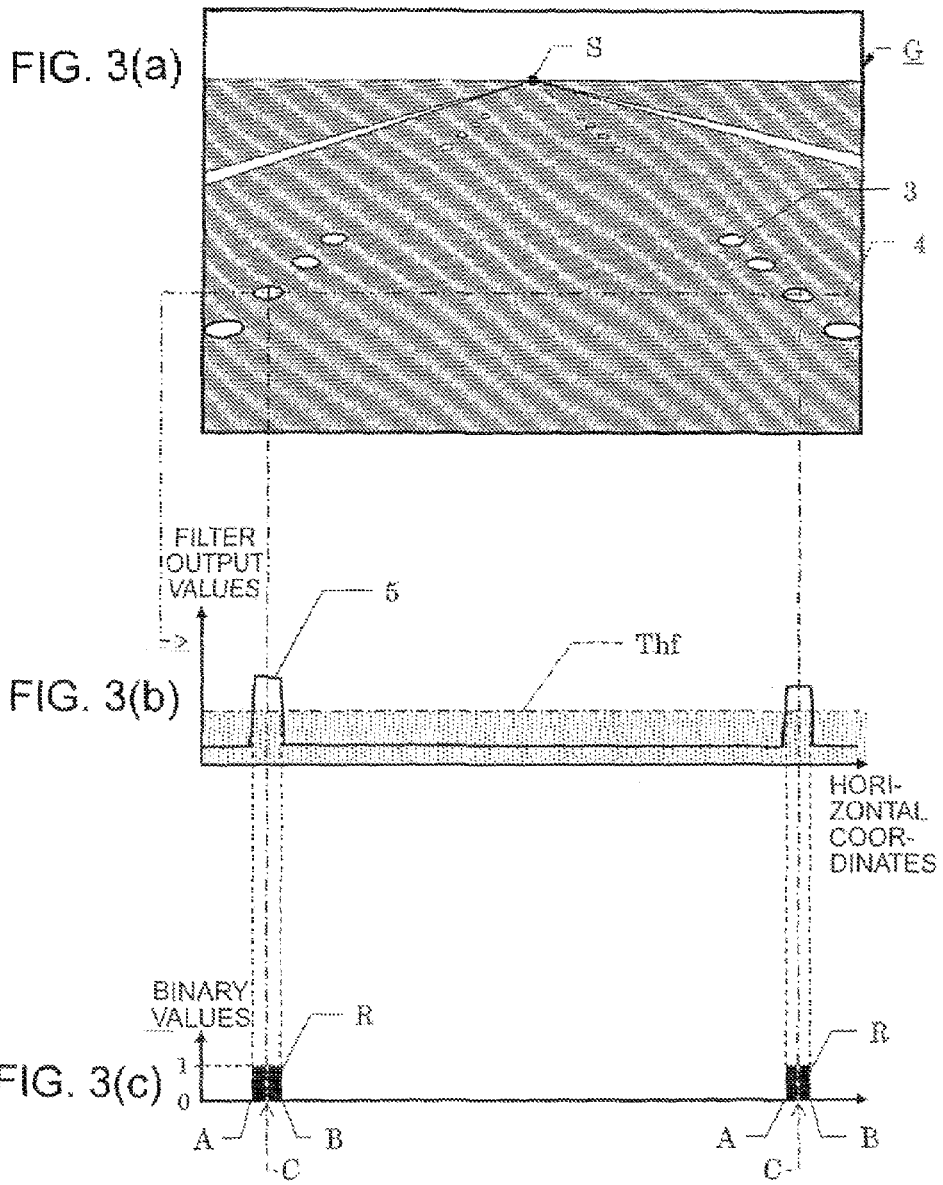
FIGS. 3(a), 3(b) and 3(c) are views showing an image of a Botts'-dot-laid road appearing in front of the motor vehicle together with a result of filter processing of the image along a horizontal line and a lane marking candidate point position based on a lane marking candidate region resulting from binarization of the result of the filter processing.

The lane marking candidate point extraction means 20 mentioned above is designed to extract the lane marking candidate points C from the image G picked up by the image pickup means 10 (see FIGS. 3(a), 3(b) and 3(c)).

On the other hand, the lane recognition means 30 is designed to recognize the lanes laid on a road on which the motor vehicle 2 is traveling on the basis of a set of the lane marking candidate points C, to thereby output a final result of the lane recognition processing by way of the lane recognition result output means 40.

The lane marking candidate point position converting means 31 incorporated in the lane recognition means 30 is so designed as to recognize as the lane marking candidate point position the position resulting from the transformation of the lane marking candidate point C onto a straight line extending in the direction toward the null point.

In that case, the lane marking candidate point position converting means 31 is designed to recognize a midpoint of a lane marking candidate region R covering a lane marking candidate point C as the lane marking candidate point position to thereby transform the lane marking candidate point C to the lane marking candidate point position, as will hereinafter be described in more detail.

To this end, the lane marking candidate decision means 33 incorporated in the lane recognition means 30 includes a threshold value setting means (not shown) for setting a threshold value. The threshold value is used as a reference for making a decision as to the validity of a set of the lane marking candidate points C. Two points corresponding to the traveling direction of the motor vehicle 2 are extracted from the set of the lane marking candidate points C and a decision is made as to whether or not there exists the inter-point distance between the two extracted points which exceeds the threshold value.

More specifically, the lane marking candidate decision means 33 is designed to decide whether or not the inter-point distance between the two points which are located most distantly as viewed in the traveling direction of the motor vehicle in the set of the lane marking candidate points C exceeds the threshold value.

The recognition processing means performs lane recognition on the basis of a set of the lane marking candidate points C acquired through conversion executed by the lane marking candidate point converting means 31, as discussed in further detail later.

In the description which follows, it is assumed that the threshold value is so set as to be equal to or exceed the transverse width of the lane marking laid on the road on which the motor vehicle 2 is traveling, while the threshold value does not exceed the set distance between the lane markings as viewed in the traveling direction of the motor vehicle 2.

Further, the invalidating means 34 incorporated in the lane recognition means 30 is designed to invalidate the information derived from the lane marking candidate points C when the inter-point distance (i.e., distance between the two points) which exceeds the above-mentioned threshold value inclusive does not exist.

Now, referring to FIGS. 3(a), 3(b) and 3(c) together with FIGS. 1 and 2, processing procedure executed by the lane recognizing image processing system according to the instant embodiment of the invention will be described more specifically.

Illustrated schematically in FIGS. 3(a), 3(b) and 3(c) is an image G outputted from the image pick-up means 10 incorporating the camera 1 together with an image processing procedure which is executed by the lane marking candidate point extraction means 20 among others.

More specifically, shown in FIG. 3(a) is an example of the image G of a road on which the motor vehicle 2 of concern is traveling and which appears in front of the motor vehicle 2, the image being picked up by the image pickup means 10 including the camera 1. As can be seen in FIG. 3(a), the Botts' dots 3 laid on the road on which the motor vehicle 2 is traveling are arrayed in the direction extending toward the null point (i.e., point at which the Botts' dot 3 disappears) S in the infinity, so to say, on the road extension line.

Shown in FIG. 3(b) is a result 5 of a filter processing performed on the image G shown in FIG. 3(a) along the lane marking search line (scan line) 4 indicated by a single horizontal line. Referring to FIG. 3(b), the filter output value is taken along the ordinate with the horizontal coordinates of the image G being taken along the abscissa. Further, as can be seen in FIG. 3(b), a filter threshold value Thf serving as the level for enabling recognition of the Botts' dot 3 is set for the values 5 resulting from the filter processing executed on a per horizontal coordinate basis.

Illustrated in FIG. 3(c) is a position determination processing of the lane marking candidate point C on the basis of the result 5 of the filter processing shown in FIG. 3(b). In FIG. 3(c), binary values ("0", "1") resulting from binarization of the filter processing result 5 are taken along the ordinate with the horizontal coordinates being taken along the abscissa. Referring to FIG. 3(c), a region resulting from conversion of the result 5 of the filter processing into the binary notation is defined as a lane marking candidate region R containing a lane marking candidate point C, and a midpoint between a start point A and an end point B of the lane marking candidate region R is defined as the position of the lane marking candidate point C.

In this conjunction, it is noted that there is a possibility that the lane marking candidate point C (or the lane marking candidate region R) extracted by the lane marking candidate point extraction means 20 may exist on the start point A or the end point B, and it is unclear whether or not the lane marking candidate point C exists on the contour line of the Botts' dot 3. In the case of the example illustrated in FIG. 3(c), it is assumed only for the convenience of description that with the function of the lane marking candidate point position converting means 31, the lane marking candidate point C exists at the position which coincides with the midpoint between the start point A of the lane marking candidate region R and the end point B thereof.

Turning back to FIG. 2, the image pickup means 10 incorporating the camera 1 takes the picture of the scene appearing in front of the motor vehicle 2, as a result of which the image G is obtained. The image G is then inputted to the lane marking candidate point extraction means 20.

As is illustrated in the image G shown in FIG. 3(a), it is assumed the lane markings laid on the left and right sides of the lane on and along which the motor vehicle 2 is traveling are constituted by the Botts' dots 3 and lie within a range of the horizontal view angle based on the lane marking search line 4.

The lane marking candidate point extraction means 20 incorporates a memory for storing the image G as luminance value data on a pixel-by-pixel basis. The lane marking candidate point extraction means 20 is designed to compare the luminance values read out from the memory with the filter threshold value Thf to thereby extract the data of the luminance values which exceed the filter threshold value Thf as the lane markings having relatively high luminance as compared with that of the road surface, as can be seen in FIG. 3(b).

To this end, the filter processing is executed in general. In this connection, there can be conceived two filter processing methods, i.e., a method of carrying out the filter processing for the distribution of the luminance values read out in the horizontal coordinate direction and a method of performing the filter processing for the rising and falling edges having positive (plus) and negative (minus) polarities, respectively.

In the description which follows, it is assumed that the lane marking candidate point extraction means 20 is designed to execute a one-dimensional image filter processing, by way of example, being understood, however, that the present invention is never restricted to the one-dimensional image filter processing.

The lane marking candidate point extraction means 20 firstly performs the one-dimensional image filter processing for the distribution of luminance on the lane marking search line 4 shown in FIG. 3(a), to thereby acquire the result 5 of the filter processing illustrated in FIG. 3(b).

As can be seen in FIG. 3(b), in the result 5 of the filter processing, the filter output value for the position of the Botts' dot 3 is higher than the filter output values in the regions preceding and succeeding to the Botts' dot, respectively.

Accordingly, by comparing the filter output value representing the Botts' dot position with the filter threshold value Thf, there can be obtained the binarized result represented by the binary notation, as illustrated in FIG. 3(c). At this juncture, the binarized regions extracted as the left and right lane markings are defined as the lane marking candidate regions R, respectively. Further, a start point and an endpoint of each lane marking candidate region R as viewed in the scanning direction orthogonally to the direction toward the null point S are defined as the start point A and the end point B, respectively, of the lane marking candidate region R.

In FIG. 3(c), the positions resulting from the conversion of the start point A and the end point B of the lane marking candidate region R by the lane marking candidate point position converting means 31 represent, respectively, the positions of the lane marking candidate points C.

Next, referring to FIGS. 4 and 5, description will be made in more detail of the processing operation performed by the lane marking candidate point position converting means 31.

Figure 4:
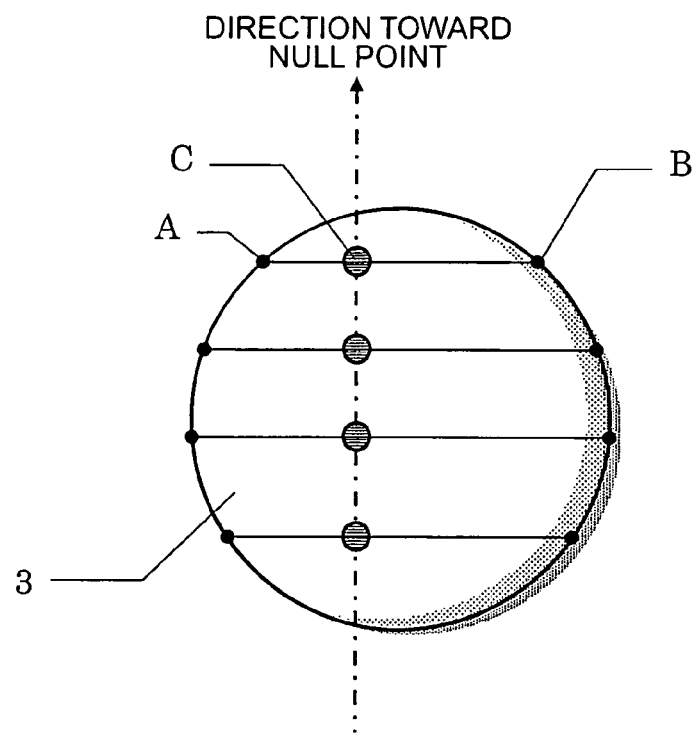
FIG. 4 is an enlarged top plan view for illustrating a processing for converting lane marking candidate points to those in a null point direction on the basis of starting points and end points of the lane marking candidate region on a single Botts' dot.
Figure 5:
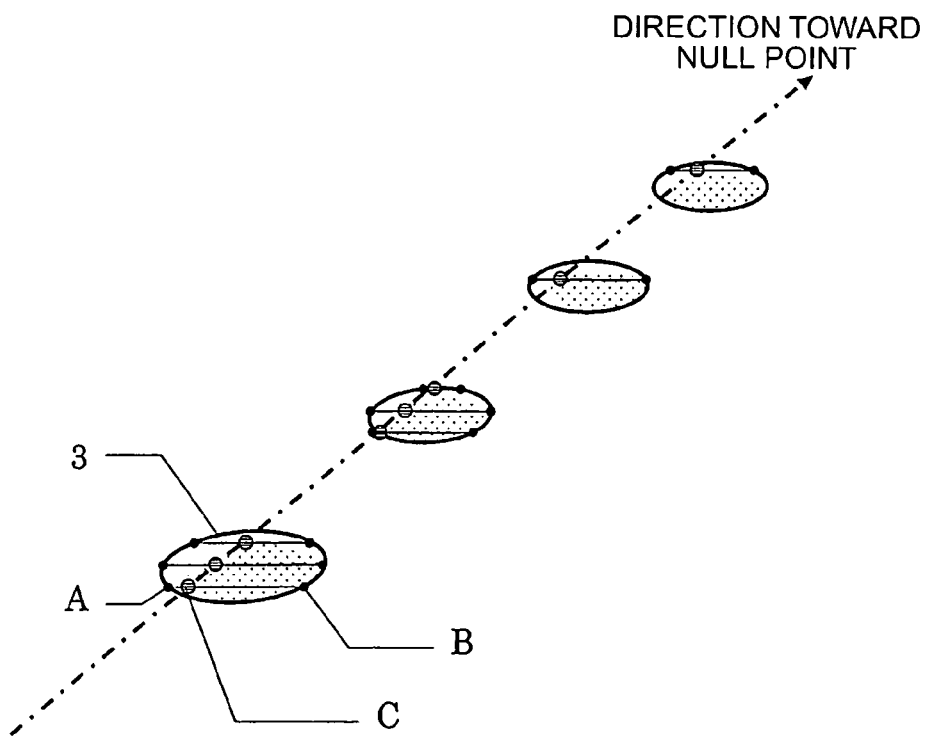
FIG. 5 is a perspective view for illustrating a processing for converting the lane marking candidate points to those in the null point direction on the basis of the starting points and the end points of the lane marking candidate region on the Botts' dots.

FIGS. 4 and 5 are views for illustrating the processing operation carried out by the lane marking candidate point position converting means 31 and show an array of the individual lane marking candidate points C in the null direction in association with the start point A and the end point B on the Botts' dots 3.

More specifically, FIG. 4 is an enlarged top plan view (overhead view) of the Botts' dot 3 showing the lane marking candidate points C on the Botts' dot 3, while FIG. 5 is a perspective view (visual field view) showing the lane marking candidate points C on a plurality of Botts' dots 3.

Referring to FIGS. 4 and 5, the position of the lane marking candidate point C can be transformed to the position on a straight line extending in the direction toward the null point S on the basis of the start point A and the end point B of the lane marking candidate region containing the lane marking candidate point C on the Botts' dot 3.

Specifically, in FIGS. 4 and 5, the straight line extending between the start point A and the end point B of the lane marking candidate region R containing the lane marking candidate point C can be converted into the position of the lane marking candidate point C on the straight line which extends in the direction toward the null point S of the Botts' dots 3 through an internal division (offsetting) method based on a predetermined rule.

By way of example, in FIG. 4, the offset position relative to the straight line extending in the direction toward the null point S and the Botts' dot 3 is determined arbitrarily by the user or operator. When the distance from the lane marking end is to be determined, the straight line which is in contact with the Botts' dot 3 may be used.

Incidentally, a description of typical ratios for determining the offset quantity, will be made later with to FIG. 6.

The conversion processing executed by the lane marking candidate point position converting means 31 is performed for the start points A and the end points B of the lane marking candidate regions R on one and the same line, while the lane marking candidate points C acquired through the lane marking candidate point extraction means 20 are converted into the points on the straight lines interconnecting the start points A and the end points B, respectively.

The result of the conversion to the lane marking candidate point positions (shown in FIG. 4) is illustrated in FIG. 5 in the visual field view (perspective view) in FIG. 5.

Now, referring to FIG. 6, description will be made of a concrete example of the ratio for determining the offset on the straight line interconnecting the start point A and the end point B.

Figure 6:
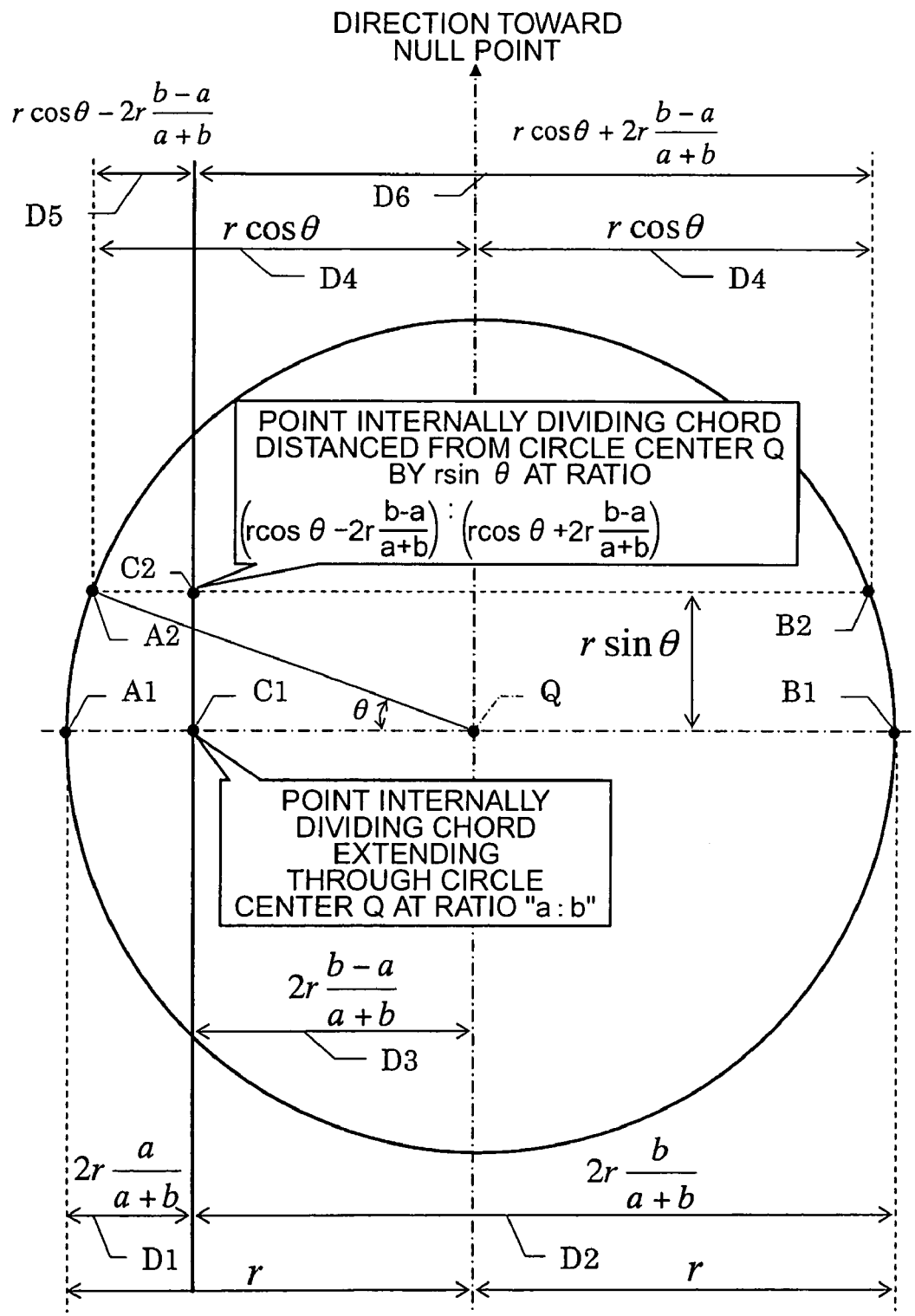
FIG. 6 is an enlarged top plan view for illustrating a processing for converting a lane marking candidate point to one in the null point direction on the basis of the starting point and the end point within the lane marking candidate region on the single Botts' dot.

FIG. 6 is a view for illustrating a rule for the conversion to the lane marking candidate point position shown in FIGS. 4 and 5. In FIG. 6, the lane marking candidate region R is represented by a circle of a radius r.

Referring to FIG. 6, in a chord (A1-B1) extending through the center Q of the circle (R), points A1, B1 and C1 correspond to the start point A, the end point B and the lane marking candidate point C, respectively.

Similarly, in a given chord (A2-B2) distanced from the center Q of the circle, individual points A2, B2 and C2 correspond to the start point A, the end point B and the lane marking candidate point C, respectively.

At first, in the lane marking candidate region R, the start points A1, A2 and the end points B1, B2 are identified on the circumference to thereby determine the center Q of the circle and the radius r, respectively.

At this juncture, it is assumed that an angle formed between a straight line interconnecting the given start point A2 (or end point B2) and the center Q of the circle on one hand and the horizontal direction or line on the other hand is given by θ. In this conjunction, it should however be mentioned that since the start point A2 and the end point B2 are positioned on one and the same horizontal line, the angle formed between the straight line interconnecting the center Q of the circle on one hand and one of the start point A2 and the end point B2 and the horizontal direction or line on the other hand may be represented by θ.

Next, in the chord (A1-B1) extending from the start point A1 to the end point B1 through the center Q of the circle shown in FIG. 6, an internally dividing point at which the distance ratio between a line segment (A1-C1) and a line segment (B1-C1) is "a:b" is represented by C1. Then, the lane marking candidate point coincides with the point C1 which internally divides the chord (A1-B1) at a ratio of "a:b".

Accordingly, a given lane marking candidate point C2 can be determined as a point which internally divides the chord (A2-B2) at a ratio given by the undermentioned expression (Exp. 1):

$$\left(r\cos\theta - 2r\frac{b-a}{a+b}\right) : \left(r\cos\theta + 2r\frac{b-a}{a+b}\right) \quad \text{(Exp. 1)}$$

Parenthetically, the ratio "a:b" represents the ratio which determines the offset positions of the individual dots 3 relative to the straight line extending in the direction toward the null point S and which can be arbitrarily set by the user, as is described previously by reference to FIGS. 4 and 5. However, since the ratio can not be altered on a dot-by-dot basis, there arises variance in the number of the candidate points, as can be seen in FIG. 5.

Now, validity of the expression (Exp. 1) will be elucidated by reference to FIG. 6.

When the ratio for the internal division of the chord (A1-B1) which extends through the center Q of the circle is given by "a:b", then the distance or length D1 of a line segment (A1-C1) can be represented by the undermentioned expression (Exp. 2) by using the radius r:

$$D1 = 2r\frac{a}{a+b} \quad \text{(Exp. 2)}$$

Similarly, the length or distance D2 of the line segment (B1-C1) can be given by the undermentioned expression (Exp. 3):

$$D2 = 2r\frac{b}{a+b} \quad \text{(Exp. 3)}$$

Further, the distance D3 between the center Q of the circle and the lane marking candidate point C1 is by subtracting the length or distance D1 from the radius r in accordance with the undermentioned expression (Exp. 4):

$$D3 = 2r\frac{b-a}{a+b} \quad \text{(Exp. 4)}$$

Furthermore, the horizontal distance D4 between the center Q of the circle and the start point A2 of the lane marking candidate region is given by the undermentioned expression (Exp. 5) by using the radius r and the angle θ:

$$D4 = r\cos\theta \quad \text{(Exp. 5)}$$

Accordingly, the distance or length D5 of the line segment (A2-C2) is determined by subtracting the distance or length D3 from the distance or length D4 in accordance with the following expression (Exp. 6):

$$D5 = r\cos\theta - 2r\frac{b-a}{a+b} \quad \text{(Exp. 6)}$$

Further, the distance D6 of the line segment (B2-C2) is determined by adding the distance D3 to the distance D4 in accordance with the following expression (Exp. 7):

$$D6 = r\cos\theta + 2r\frac{b-a}{a+b} \quad \text{(Exp. 7)}$$

Thus, the lane marking candidate point C2 can be determined as a point which internally divides the chord (A2-B2) in accordance with the following expression (Exp. 8):

$$\left(r\cos\theta - 2r\frac{b-a}{a+b}\right) : \left(r\cos\theta + 2r\frac{b-a}{a+b}\right) \quad \text{(Exp. 8)}$$

The above expression (Exp. 8) is identical with the expression (Exp. 1) mentioned previously. Thus, it is safe to say that the expression (Exp. 1) is valid.

Parenthetically, since the ratio "a:b" is a constant which can be arbitrarily set, the given lane marking candidate point C2 is not limited to the internally dividing point but may be an externally dividing point which satisfies the condition given by the expression (Exp. 1).

Further, in the case where "a=b", the ratio given by the expression (Exp. 1) is "1:1" regardless of the radius r and the angle θ, and thus the midpoint of the straight line interconnecting the start point A and the end point B in the lane marking candidate region R represents the converted position of the lane marking candidate point C.

Furthermore, in the case where "a"="1" and "b"="0", the converted position of the lane marking candidate point C in accordance with the expression (Exp. 1) is located on a straight line contacting the dot 3 on the right-hand side thereof and extending in the direction toward the null point S.

On the contrary, in the case where "a"="0" and "b"="1", the converted position of the lane marking candidate point C in accordance with the expression (Exp. 1) is set on a straight line which contacts the dot 3 on the left-hand side thereof and which extends in the direction toward the null point S.

Figure 7:
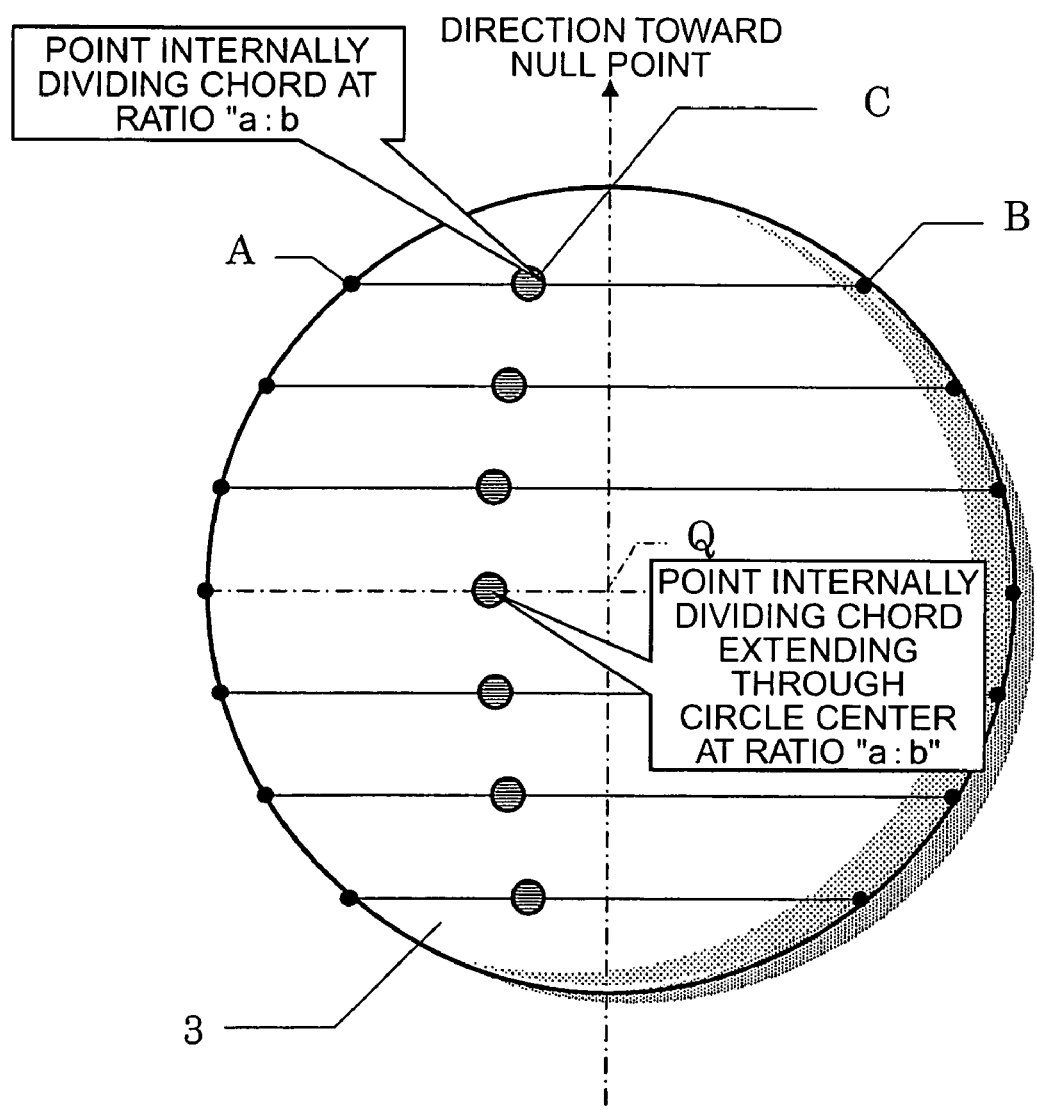
FIG. 7 is an enlarged top plan view for illustrating a simplified processing for converting the lane marking candidate point to one in the null point direction on the basis of the starting point and the end point of the lane marking candidate region on the single Botts' dot.

The conversion processing executed in accordance with the expression (Exp. 1) on the basis of the model illustrated in FIG. 6 incurs a high cost in the arithmetic operations as involved. Accordingly, a more convenient processing method can be conceived according to which the lane marking candidate point C is converted to the position resulting from the internal division of the distance between the start points A and the end points B of the lane marking candidate region R (Botts' dot 3) at the ratio of "a:b", as is illustrated in FIG. 7.

In succession, the converted positions of the lane marking candidate points C can be determined for the whole image G (see FIGS. 3(a), 3(b) and 3(c)) (or over a given range of the image G) by extracting the start points A and the end points B of the lane marking candidate regions R on a per search line basis by scanning the image G or the given range thereof with the lane marking search lines in a sequential order.

The recognition processing means 32 incorporated in the lane recognizing means 30 is designed to perform the lane recognition, wherein the lanes are recognized by identifying coefficients of a polynomial using least squared methods from a plurality of lane marking candidate points C acquired through the conversion executed by the lane marking candidate point position converting means 31 as described above.

In that case, as the lane recognition method, estimation arithmetic based approximation with a mathematical model of the lane marking is often resorted to.

As the method of mathematically modeling the lane marking, there can be mentioned a linear approximation between the lane marking candidate points C, a rectilinear or curvilinear approximation for the set of the lane marking candidate points C, a method of rectilinear approximation for a plurality of regions delimited by distances in front of the motor vehicle, a method of adopting the rectilinear approximation or the curvilinear approximation in dependence on the distance in front of the motor vehicle and so forth. In addition, a procedure for causing the motor vehicle to travel on and along the lane with the aid of a string model may be adopted.

In this conjunction, it should be added that in the case where the estimation arithmetic in accordance with the mathematical model expression is not adopted, there can be conceived a method of arithmetically determining horizontal positions only of the paired lane marking candidate points C which exist on both the left and right sides, respectively, of the lane through the coordinate transformation of the lane marking candidate points C to the plane coordinate system thereof.

Next, referring to FIGS. 8 to 11, description will be directed to the rectilinear approximation processing and the decision processing executed by the lane marking candidate decision means 33 according to the first embodiment of the present invention.

Figure 8:
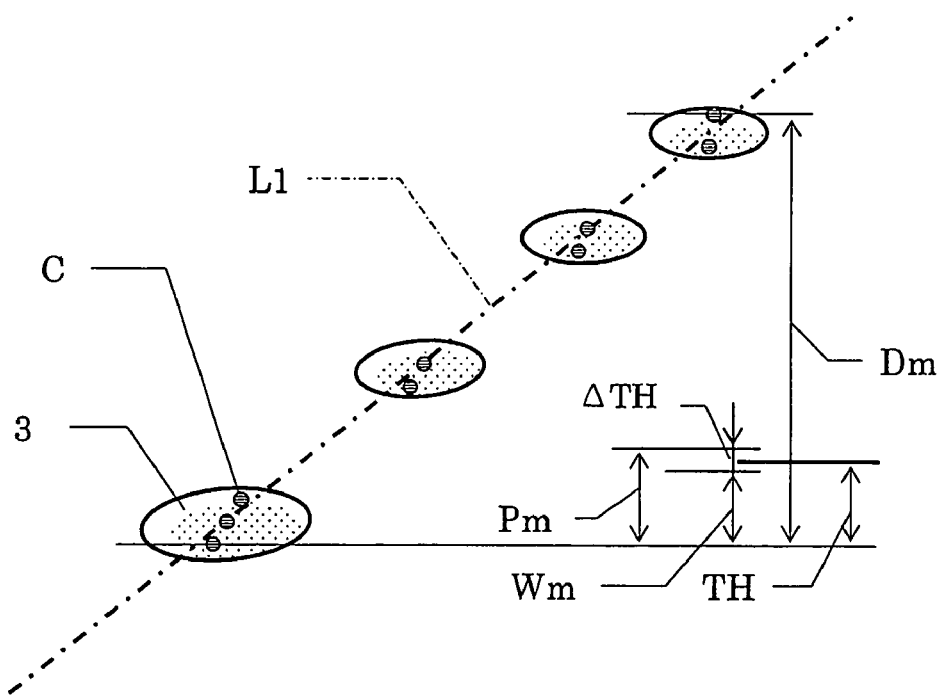
FIG. 8 is a perspective view for illustrating the lane marking candidate points on the Botts' dots laid on the left-hand side of a driving road together with various decision parameters.

FIG. 8 is a perspective view showing the lane marking candidate points C on the Botts' dots 3 laid on the left-hand side of the driving road and the approximate straight line L1 extending in the lane direction together with a maximum distance Dm between the lane marking candidate points C, the distance Pm between the lane markings (hereinafter referred to as the inter-lane marking distance), the transverse width Wm of the lane marking (hereinafter also referred to as the lane marking width), a threshold value TH for the maximum distance Dm and a preset threshold value range ΔTH for the maximum distance Dm.

Figure 9:
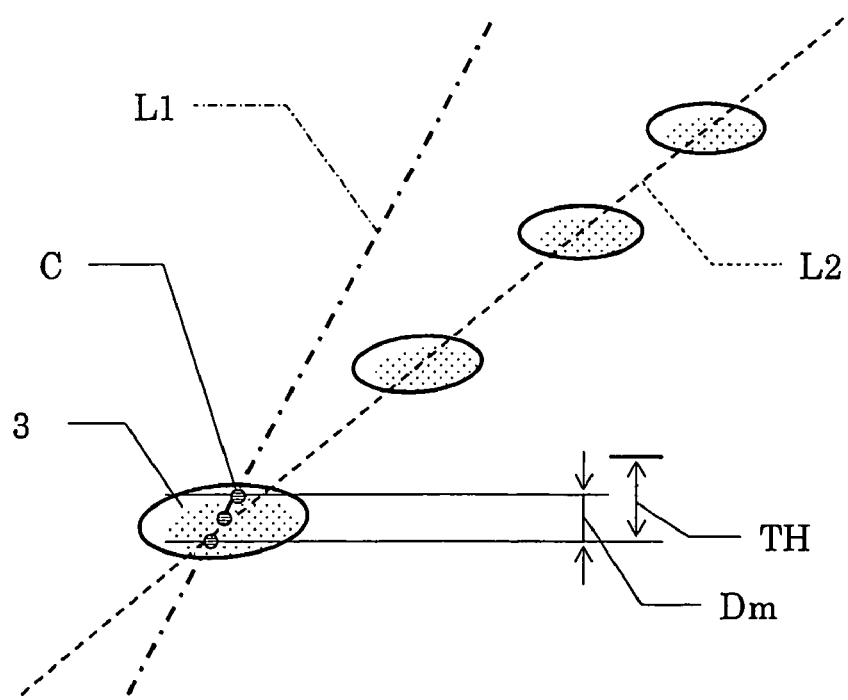
FIG. 9 is a perspective view for illustrating the lane marking candidate points on a single dot laid on the left-hand side of the driving road together with various decision parameters.

On the other hand, FIG. 9 shows in a perspective view the lane marking candidate points C, the maximum distance Dm and the threshold value TH in combination with the Botts' dots 3 on the approximate straight line L1 and a lane boundary line L2.

Figure 10:
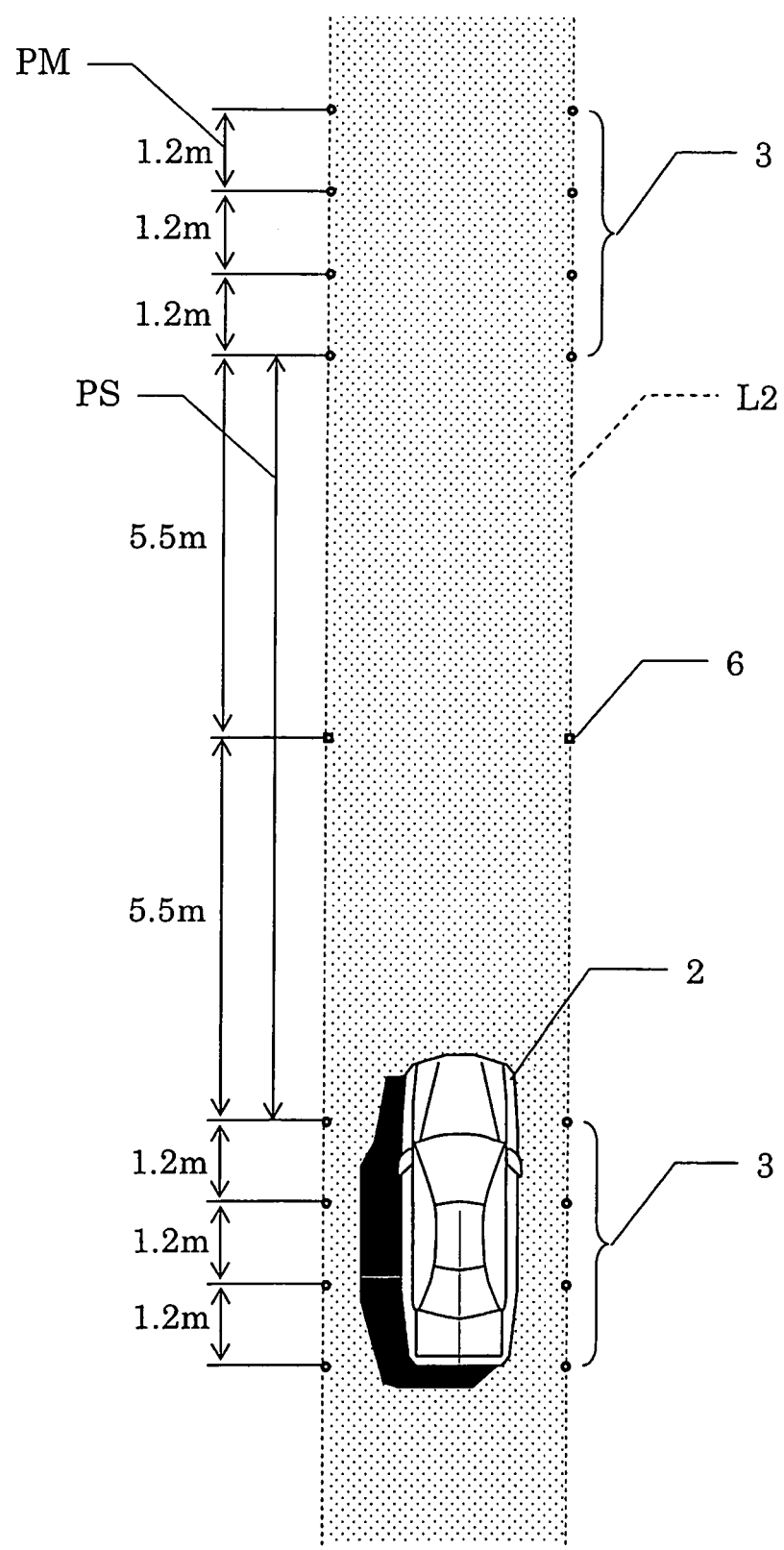
FIG. 10 is a top plan view showing distances among the Botts' dots and reflectors laid on a driving road.

Further, FIG. 10 shows in a top plan view the lane boundary lines L2 extending in the traveling direction of the motor vehicle 2 together with the Botts' dots 3 (lane markings) reflectors 6, the inter-lane marking distance PM (=1.2 [m]) and an inter-set distance PS (=5.5 [m]×2) of the Botts' dot sets (lane marking sets) (i.e., distance between the sets of the Botts' dots 3).

Figure 11:
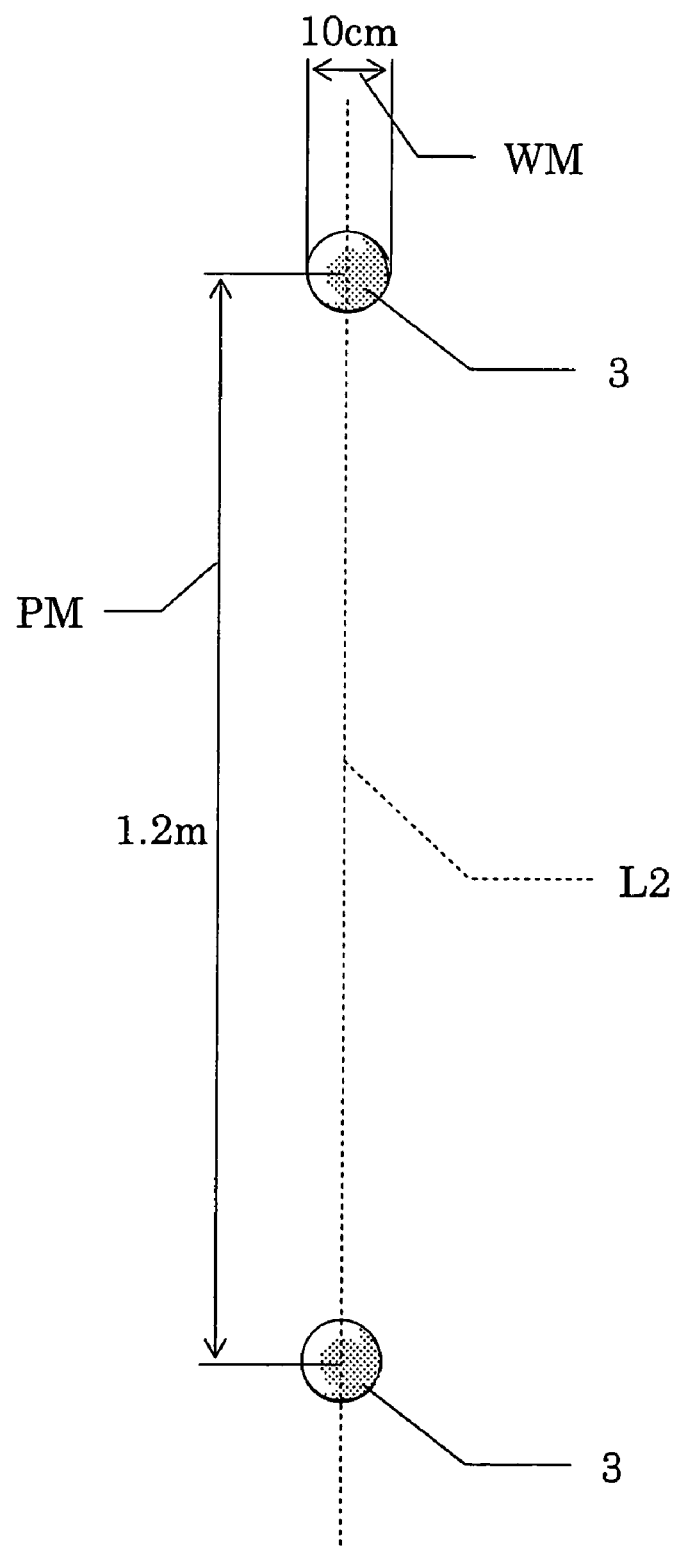
FIG. 11 is a top plan view showing a width of the Botts' dot.

In addition, FIG. 11 shows in a top plan view the inter-lane marking distance PM (=1.2 [m]) (i.e., distance between the adjacent lane markings) and the lane marking width WM (=10 [cm]) of the Botts' dot3 in association with the Botts' dots 3 on the lane boundary line L2.

Referring to FIG. 8, the approximate straight line L1 represents a result of the least square rectilinear approximation processing executed for sets of the lane marking candidate points C recognized within the lane marking candidate regions R (Botts' dots 3).

At this juncture, it can be appreciated that so long as the lane recognition is normal or correct, the approximate straight line L1 coincides with the lane boundary line L2 represented by the Botts' dots 3.

In the case where the lane marking candidate points C are distributed over a plurality of Botts' dots 3, as is illustrated in FIG. 8, the approximate straight line L1 coincides with the lane boundary line L2.

In the following, the decision processing executed by the lane marking candidate decision means 33 will be described more concretely.

Referring to FIG. 8, the distance between the nearest point and the remotest point of the individual lane marking candidate points C (nine points in total in the case of the example illustrated in FIG. 8) in the traveling direction of the motor vehicle is defined as the maximum distance Dm among the lane marking candidate points C.

The inter-lane marking distance PM (see FIG. 10) represents the distance between the adjacent lane markings (Botts' dots 3) as observed in a top plan view. The value resulting from the coordinate transformation of the inter-lane marking distance PM in the plan view to that observed in a perspective view is represented by the inter-lane marking distance Pm (see FIG. 8).

Similarly, the value obtained from the coordinate transformation of the lane marking width WM observed in the plan view (see FIG. 11) to that observed in the perspective view relative to the traveling direction of the motor vehicle is represented by lane marking width Wm (see FIG. 8).

In the case of the example now under consideration, it is assumed by way of example only, that the inter-lane marking distance PM is 1.2 [m] with the lane marking width WM being 10 [cm], as can be seen in FIGS. 10 and 11.

The values of the inter-lane marking distance Pm and the lane marking width Wm resulting from the coordinate transformation to the perspective view differ in dependence on the vertical coordinate positions of the lane markings. Accordingly, the values mentioned above are set with reference to the vertical coordinates of the nearest point, as shown in FIG. 8.

Further, the preset threshold value range ΔTH is set so as to lie beyond the lane marking width Wm inclusive and below the inter-lane marking distance Pm inclusive, as illustrated in FIG. 8. The threshold value TH (see FIGS. 8 and 9) is set so as to fall within the preset threshold value range ΔTH.

Referring to FIGS. 8 and 9, the maximum distance Dm between the lane marking candidate points C is checked with reference to the threshold value TH. In the case of the example illustrated in FIG. 8, since the maximum distance Dm is greater than the threshold value TH (i.e., Dm>TH), it can be determined that the lane marking candidate points C exist on and over a plurality of Botts' dots 3.

By contrast, in the case of the example illustrated in FIG. 9, the maximum distance Dm is smaller than the threshold value TH (i.e., Dm<TH), and thus it is determined that the lane marking candidate points C exist only on the single dot 3.

As can be seen from the above, by using the threshold value TH, it is possible to make a decision as to whether the lane marking candidate points C exist on and over a plurality of Botts' dots 3, or the lane marking candidate point C exists only on the single Botts' dot 3.

In other words, in the case where the lane marking candidate points C exist only on the single dot 3 as illustrated in FIG. 9, the approximate straight line L1 as acquired may be remarkably departed from the lane boundary line L2 indicated by the array of the Botts' dots 3.

In the foregoing, the decision as to the relation between the approximate straight line L1 and the lane boundary line L2 is made on the basis of the perspective view (visual field view) as in the case of the examples illustrated in FIGS. 8 and 9. It should be understood, however, that similar results can be obtained by the decision for the lane marking candidate points C after the coordinate transformation thereof to the plan view (overhead view state).

Further, although the maximum distance Dm between the lane marking candidate points C is used in the decision described above, it should be added that a similar result can be obtained by extracting, arbitrarily, pairs of points from a set of the lane marking candidate points C instead of using the maximum distance Dm between the lane marking candidate points C and making a decision as to whether a combination of the inter-point distance between the two points exceeds the threshold value TH.

Next, referring to FIG. 9, the invalidation processing executed by the invalidating means 34 incorporated in the lane recognizing means 30 will be described.

The invalidating means 34 is designed to invalidate the data derived from the lane marking candidate points C when the maximum distance Dm between the lane marking candidate points C is not greater than the threshold value TH.

As a first example of the invalidation processing executed by the invalidating means 34, there can be mentioned a method of invalidating the lane marking candidate points C themselves.

In this case, because the lane marking candidate points C extracted by the lane marking candidate point extraction means 20 are invalidated, the results of the processing executed and outputted from the lane marking candidate point position converting means 31 and the recognition processing means 32 (see the broken-line block shown in FIG. 1) incorporated in the lane recognizing means 30 which is disposed at a stage succeeding to the lane marking candidate point extraction means 20 are all rendered invalid.

As a second example of the invalidation processing executed by the invalidating means 34, a method of invalidating the lane marking candidate point positions outputted from the lane marking candidate point position converting means 31 may be mentioned.

In this case, all the results of processing acquired through the recognition processing means 32 provided at a stage succeeding to the lane marking candidate point position converting means 31 are invalid data.

Further, as a third example of the invalidation processing executed by the invalidating means 34, a method of invalidating the result of the lane recognition outputted from the recognition processing means 32 can be conceived.

In this case, the lane recognition result output means 40 disposed at a stage succeeding to the recognition processing means 32 is invalidated. Accordingly, even when the results of the lane recognition are outputted externally of the image recognition system by a communication means, the results outputted are invalid data.

Furthermore, as a fourth example of the invalidation processing executed by the invalidating means 34, there can be mentioned a method of outputting the results of the lane recognition executed by the lane recognition means 30 together with an invalidation flag when a vehicle control or a lane departure warning control is performed by checking the results of the lane recognition outputted from the lane recognizing means 30 externally of the lane recognizing image processing system.

In this case, even when the results of the lane recognition are outputted, invalidity thereof can be recognized because the invalidation flag is simultaneously outputted.

In addition, as a fifth example of the invalidation processing executed by the invalidating means 34, there can be mentioned a method of inhibiting the results of the lane recognition from being outputted from the lane recognizing means 30.

In this case, since the results of the lane recognition referenced or checked externally of the lane recognizing image processing system are not updated yet, the system assumes the state in which the results of the preceding lane recognition are continuously held or the state in which the sight of the lane has been lost.

At this juncture, it should be added that the concrete processing executed by the invalidating means 34 is not restricted to the examples mentioned above. In other words, so long as the invalidation can be realized, any other appropriate method may be adopted as occasion requires.

As is apparent from the foregoing, the lane marking candidate point position converting means 31 incorporated in the lane recognizing means 30 is so designed as to transform or convert the lane marking candidate point(s) C derived on the basis of the start point(s) A and the endpoint (s) B in the lane marking candidate region R to the point(s) on the straight line which extends toward the null point S, whereon the position(s) of the point (s) resulting from the conversion (e.g. intermediate or midpoint(s)) between the start point (s) A and the end point (s) B) is set as the lane marking candidate point position(s).

On the other hand, the lane marking candidate decision means 33 equally incorporated in the lane recognizing means 30 makes the decision as to whether or not the lane marking candidate point C exists only on the single dot 3 by deciding whether or not the value of the inter-point distance between the two points in the set of the lane marking candidate points C is smaller than the threshold value TH inclusive, or alternatively, whether or not the value of the maximum distance Dm between the two points located most remotely in the set of the lane marking candidate points C is smaller than the threshold value TH inclusive.

The invalidating means 34 is designed to invalidate the information derived from the lane marking candidate points C when the value of the inter-point distance between the two points is smaller than the threshold value TH inclusive.

As is apparent from the foregoing, the lane recognizing image processing system according to the first embodiment of the present invention is comprised of the lane marking candidate point extraction means 20 for extracting the lane marking candidate points C from the image G taken by the image pickup means 10 and the lane recognizing means 30 for recognizing, on the basis of the set of the lane marking candidate points C, the lane on the road on which the motor vehicle equipped with the lane recognizing image processing system is traveling. The lane marking candidate point position converting means 31 incorporated in the lane recognizing means 30 is designed to recognize, as the lane marking candidate point position, the positions of the lane marking candidate points C converted or transformed to the straight line extending in the null direction, in order to convert or transform the lane marking candidate points C to the lane marking candidate point positions.

With the arrangement of the lane recognizing image processing system described above, it is possible to stabilize the positions of the lane marking candidate points C on the individual dots 3 independently of the position of the lane marking search line 4 and the resolution.

Further, when the lane marking candidate points C exist on a plurality of Botts' dots 3, as illustrated in FIG. 8, the result of the lane recognition in which the mathematical model of the lane markings coincides with the lane boundary line L2 can be obtained.

Further, the lane marking candidate point position converting means 31 is so designed as to recognize the midpoint or intermediate point of the lane marking candidate region R including the lane marking candidate points C as the lane marking candidate point position. By virtue of this feature, the lane marking candidate point position can easily be recognized with a simplified procedure without increasing appreciably the load imposed on hardware/software.

Furthermore, the lane recognizing means 30 is comprised of the threshold value setting means for setting the threshold value TH serving as the reference for the decision as to validity of the set of the lane marking candidate points C, and the lane marking candidate decision means 33 for extracting paired points corresponding to the traveling direction of the motor vehicle 2 from the set of the lane marking candidate points C to thereby make the decision as to whether or not the paired points whose inter-point distance exceeds the threshold value TH exists among the extracted paired points. Thus, in the lane recognition based on the lane markings constituted by the dots such as the Botts' dots 3, the decision as to the reliability of the lane marking candidate point C can be realized conveniently, since it is sufficient to this end to check whether or not the lane marking candidate point or points C exist only on the single Botts' dot 3, whereby useful information concerning the reliability of the lane recognition can be made available for the processes which succeed the decision.

Additionally, the lane marking candidate decision means 33 incorporated in the lane recognizing means 30 can be so designed as to decide whether or not the distance between the two points located most remotely as viewed in the traveling direction of the motor vehicle 2 and belonging to the set of the lane marking candidate points C exceeds the threshold value TH. With the arrangement mentioned above, it is sufficient to reference or check only the first and last lane marking candidate point positions when extraction of the lane marking candidate points C is carried out sequentially in the direction from the nearest lane marking candidate point to the remotest point C. Thus, the decision processing can be executed very conveniently without increasing appreciably the load imposed on hardware/software.

Besides, since the threshold value TH is set so as to be equal to or greater than the lane marking width Wm of the lane marking on the road of the motor vehicle 2 and equal to or smaller than the inter-set distance PS between the sets of the lane markings in the traveling direction of the motor vehicle 2, the threshold value TH for the lane marking maximum distance Dm employed as the reference for making the decision as to the existence of the lane marking candidates on the single Botts' dot 3 can be set with high accuracy in conformance with the size of the lane marking and the distance between the lane markings which may vary depending on the localities or districts.

Further, the lane recognizing means 30 may include the invalidating means 34 for invalidating the information derived from the lane marking candidate points C in the case where the inter-point distance between the two points does not exceed the threshold value TH. Owing to this arrangement, the result of the lane recognition of low reliability can be invalidated, whereby generation of erroneous warning (erroneous lane departure warning) and erroneous control (erroneous steering control of the motor vehicle) based on the result of the recognition deviated from the actual lane boundary line L2 can be avoided.

Embodiment 2

Next, description will be made of the lane recognizing image processing system according to a second exemplary embodiment of the present invention, which system differs from the first exemplary embodiment in the respect that the lane recognition means additionally includes a lane recognition result storing means for validating the precedingly stored information when the invalidation processing is executed.

Figure 12:
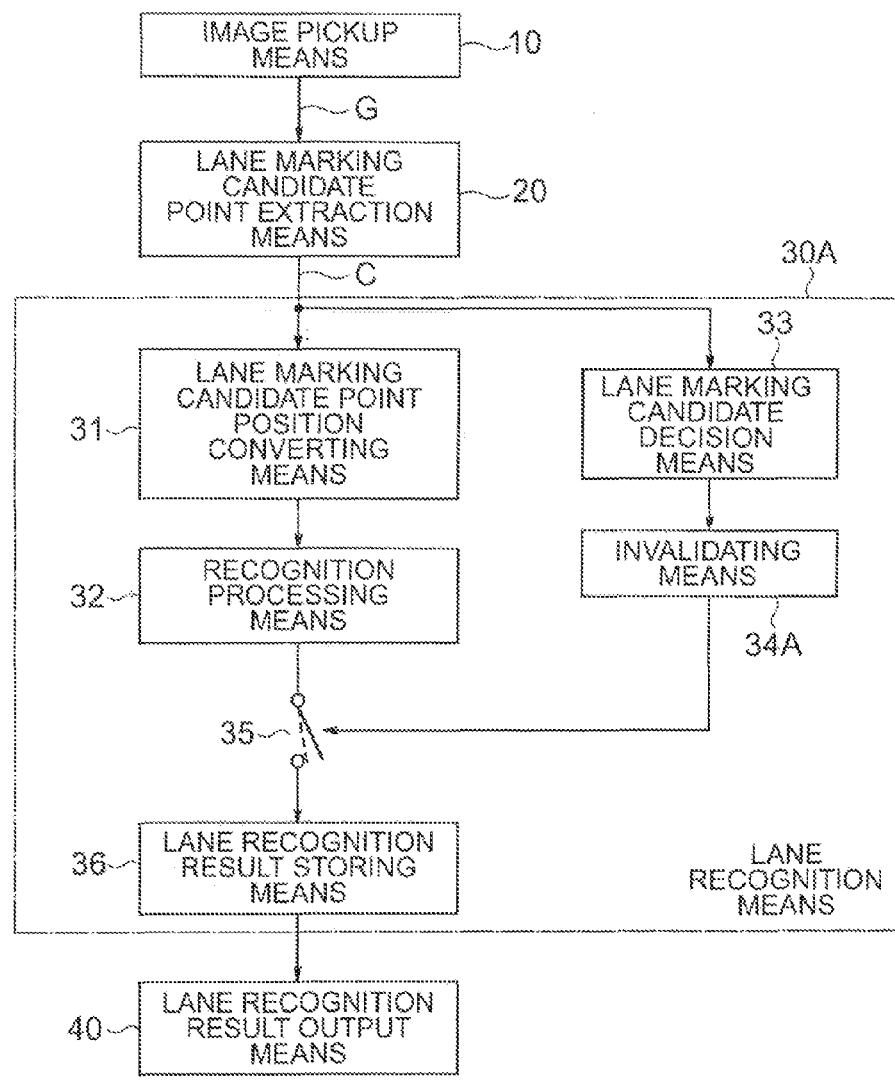
FIG. 12 is a functional block diagram showing schematically a configuration of the lane recognizing image processing system according to a second embodiment of the present invention.

Now referring to FIG. 12, description will be directed to the lane recognizing image processing system according to the second exemplary embodiment of the invention in which the lane recognition result storing means 36 is incorporated.

FIG. 12 is a functional block diagram showing a configuration of the lane recognizing image processing system according to the second embodiment of the invention. In FIG. 12, components or means same as or equivalent to those described hereinbefore by reference to FIG. 1 are denoted by like reference numerals affixed with or without "A".

Referring to FIG. 12, the lane recognition means 30A includes, in addition to the lane marking candidate point position converting means 31, the recognition processing means 32, the lane marking candidate decision means 33 and the invalidating means 34A described hereinbefore, a switching means 35 provided on the output side of the recognition processing means 32 and a lane recognition result storing means 36 for storing the result of the lane recognition outputted from the recognition processing means 32.

The lane recognition means 30A is so programmed or designed as to validate the information precedingly stored in the lane recognition result storing means 36 in response to the invalidation processing in the case where the current information is invalidated by the invalidating means 34A.

Further, the lane recognition means 30A is designed such that when the invalidation processing executed by the invalidating means 34A continues over or beyond a predetermined time period, the validation processing of the stored information held in the lane recognition result storing means 36 is continued for a predetermined time period corresponding to the time taken for the motor vehicle 2 to travel or cover the inter-set distance PS of the lane markings while disabling or inhibiting the validation processing of the stored information after the lapse of the predetermined period mentioned above.

Reference is made to FIG. 12. Ordinarily, the invalidation processing is not executed by the invalidating means 34A. Thus, the switching means 35 is closed (or turned on) as indicated by a phantom line in FIG. 12. In this state, the lane recognition result storing means 36 stores therein the result of the lane recognition delivered from the recognition processing means 32. At the same time, the result of the lane recognition is outputted from the lane recognition means 30A by way of the lane recognition result storing means 36 to be delivered externally of the lane recognizing image processing system through the medium of the lane recognition result output means 40. As the information output method to this end, there can be mentioned a serial data communication, a CAN (Controlled Area Network) communication or the like.

On the other hand, when the invalidating means 34A is activated and thus the invalidation processing of the current data outputted from the lane marking candidate point extraction means 20 is to be executed, the switching means 35 is opened (turned off) to the position indicated by a solid line in FIG. 12 in response to the invalidation signal. As a consequence, the processing for storing the result of the lane recognition in the lane recognition result storing means 36 is inhibited or disabled.

However, since the result of the lane recognition resulting from the preceding lane recognition processing is stored or held in the lane recognition result storing means 36, the result of the preceding lane recognition is delivered as the validated information externally of the lane recognizing image processing system through the lane recognition result output means 40.

To say in another way, when the invalidation processing is executed by the invalidating means 34A, the result of the preceding lane recognition stored in the lane recognition result storing means 36 is used as the data (result of the lane recognition) outputted through the lane recognition result output means 40.

At this juncture, it should be added that so long as the result of the preceding lane recognition stored in the lane recognition results to ring means 36 is held continuously, the finally validated result of the lane recognition (latest data) continues to be outputted or delivered.

However, it is undesirable from the standpoint of the real-time-based processing to utilize endlessly the preceding data. Accordingly, the validation processing of the stored information is continued only for a predetermined period in dependence on the speed of the motor vehicle.

For the reason mentioned above, it is desirable to continue the validation processing of the stored information held in the lane recognition result storing means 36 for the predetermined period which corresponds to the time taken for the motor vehicle 2 (see FIG. 10) to run or cover, for example, the inter-set distance PS of the Botts' dots 3 (=5.5×2 [m]=11.0 [m]).

By way of example, when the motor vehicle 2 is running at a speed of 80 [km/h], the predetermined period for which the validation of the stored information is continued is 0.5 second.

In this way, the result of the preceding lane recognition can be outputted in continuation even in the course of the invalidation processing, while after lapse of the predetermined period, validation of the result of the preceding lane recognition can be disabled in order to sustain the real-time performance.

As is apparent from the foregoing, in the case where the lane recognition becomes impossible when the motor vehicle 2 is traveling on the road on which the Botts' dots 3 are laid, the result of the preceding lane recognition stored in the lane recognition result storing means 36 is used.

More specifically, the lane recognizing means 30A includes the lane recognition result storing means 36 for storing the result of the lane recognition. When the information is invalidated by the invalidating means 34A, the information stored in the lane recognition result storing means 36 is validated. Thus, even when only a given frame is invalidated for the lane recognition, the result of the preceding lane recognition is held while eliminating only the frame susceptible to erroneous recognition. By virtue of this feature, robust result of the lane recognition which ensures high reliability can be obtained.

Further, the predetermined period (upper limit time) for which the result of the preceding lane recognition is held in the lane recognition result storing means 36 is set to the time taken for the motor vehicle 2 to cover the inter-set distance PS of the lane markings.

As is apparent from the above, when the invalidation processing executed by the invalidating means 34A continues over or beyond a predetermined time, the lane recognizing means 30A allows the validation processing for validating the information stored in the lane recognition result storing means 36 to be continued for the predetermined period corresponding or equivalent to the time taken for the motor vehicle 2 to run for the inter-set distance PS of the lane markings while inhibiting the validation processing of the stored information at the time point the predetermined period has elapsed. Thus, even in the case where the invalidation processing is continued over a plurality of frames, the result of the preceding lane recognition which serves as the reference for the succeeding lane marking search is held only for the predetermined period (i.e., for the time taken for the motor vehicle to cover the inter-set distance PS of the lane markings), whereby speedy restoration to the lane recognition processing (ordinary processing) can be realized while ensuring the real time basis.

Embodiment 3

In the case of the lane recognizing image processing system according to the second exemplary embodiment of the present invention described above, the result of the preceding lane recognition is delivered when the invalidation processing is executed. A third exemplary embodiment of the present invention concerns the lane recognizing image processing system which is arranged such that the lane recognizing means includes a time-based average processing means, wherein when only one given frame becomes invalid for the lane recognition in the course of the lane recognition processing, a result of time-based average processing for which adverse influence of the lane recognition invalidation is mitigated is delivered as the output of the time-based average processing means.

In the following, the lane recognizing image processing system according to the third embodiment of the invention which system incorporates the time-based average processing means 37 will be described by reference to FIG. 13.

Figure 13:
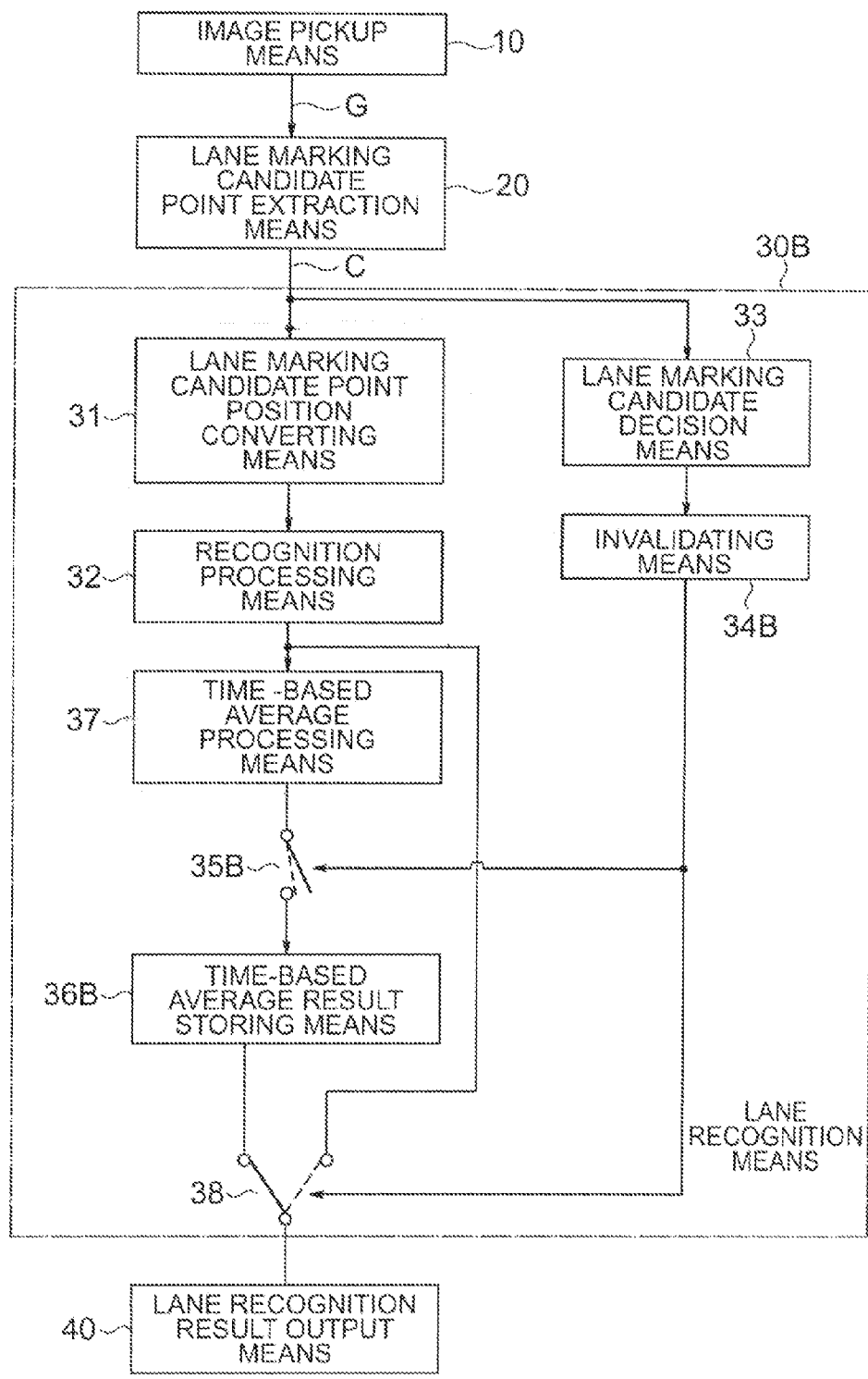
FIG. 13 is a functional block diagram showing schematically a configuration of the lane recognizing image processing system according to a third embodiment of the present invention.

FIG. 13 is a functional block diagram showing a configuration of the lane recognizing image processing system according to the third embodiment of the present invention. In FIG. 13, components or means same as or equivalent to those described hereinbefore by reference to FIG. 12 are denoted like reference numerals affixed with or without "B".

Referring to FIG. 13, the lane recognition means 30B includes in addition to the lane marking candidate point position converting means 31, the recognition processing means 32, the lane marking candidate decision means 33, the invalidating means 34B and the switching means 35B described hereinbefore, the time-based average processing means 37 provided on the output side of the recognition processing means 32, a time-based average result storing means 36B provided on the output side of the time-based average processing means 37 and a switching means 38 provided on the output side of the time-based average result storing means 36B.

The time-based average processing means 37 is so programmed or designed as to perform a time-based average processing on the result of the lane recognition outputted from the recognition processing means 32, while the time-based average result storing means 36B stores the result of the time-based average processing outputted from the time-based average processing means 37.

The above arrangement provides an advantage in the case where only one given frame becomes invalid for the lane recognition in the course of the lane recognition, the result of the time-based average processing for which the adverse influence due to the invalid frame is mitigated by the time-based averaging can be held in storage even if the result of the preceding lane recognition is erroneous recognition.

As the time-based average processing executed by the time-based average processing means 37, there can be employed a temporal filter processing such as a low-pass filter processing, or the like.

The lane recognition means 30B is designed to validate the preceding data (stored information) held in the time-based average results to ring means 36B when the information is invalidated by the invalidating means 34B.

In addition, the lane recognition means 30B is so programmed or designed that when the invalidation processing executed by the invalidating means 34B has continued over or beyond a predetermined time, the validation processing of the stored information held by the time-based average result storing means 36B is continued for a predetermined period corresponding to the time taken for the motor vehicle to cover the inter-set distance PS of the lane markings (Botts' dots 3).

Ordinarily, the invalidation processing is not executed. Accordingly, the switching means 35B is closed (or turned on) as indicated by a phantom line in FIG. 13. In this state, the time-based average result storing means 36B can store therein the result of the time-based average processing delivered from the time-based average processing means 37.

At this time point, the switching means 38 is set to the position indicated by a phantom line in FIG. 13 to transfer the result of the lane recognition outputted from the recognition processing means 32 to the lane recognition result output means 40.

Consequently, the result of the lane recognition is delivered from the lane recognizing means 30B externally of the lane recognizing image processing system through the medium of the lane recognition result output means 40.

On the other hand, when the invalidation processing is executed by the invalidating means 34B, the switching means 35B is changed over to the "OFF" position indicated by the solid line in FIG. 13 in response to the invalidation signal. Consequently, the storing processing for storing the result of the time-based average processing in the time-based average result storing means 36B is inhibited.

At the same time, the switching means 38 is changed over to the position indicated by a solid line to be thereby connected to the lane recognition result output means 40. As a consequence, the result of the time-based average processing executed up to the preceding processing held in the time-based average result storing means 36B is delivered externally of the lane recognizing image processing system as the validated information through the lane recognition result output means 40.

Thus, when the invalidation processing is executed by the invalidating means 34B, the result of the time-based average processing of the result of the lane recognition up to the preceding processing is employed as the output data (result of the lane recognition) delivered to the lane recognition result output means 40.

As is apparent from the above, the lane recognition result output means 40 uses properly or selectively the output data (result of the lane recognition). More specifically, the result of the lane recognition outputted from the recognition processing means 32 is ordinarily used, whereas when the invalidation processing is executed by the invalidating means 34B, the result of the time-based average processing stored in the time-based average result storing means 36B is used.

In this conjunction, it is noted that so long as the result of the time-based average processing stored in the time-based average result storing means 36B is held in continuation, as in the case of the lane recognizing image processing system according to the second embodiment of the invention, the result of the time-based average processing updated finally will be outputted endlessly. In that case, however, the real time performance of the lane recognizing image processing system is degraded, giving rise to a problem. For coping with this problem, the validation processing of the information stored in the time-based average result storing means 36B is continued only for the predetermined time period taken for the traveling motor vehicle 2 (see FIG. 10) to cover the inter-set distance PS of the Botts' dots 3 (lane markings) (=11.0 [m]), e.g. for a period of 0.5 second, when the motor vehicle 2 is traveling at a speed of 80 km/h.

Thus, the result of the time-based average of the result of the lane recognition up to the preceding processing can continuously be outputted even when the invalidation processing is being executed, and when the predetermined period has elapsed, the validation processing of the result of the time-based average processing can be disabled with a view to protecting the real time performance against degradation.

Figure 14:
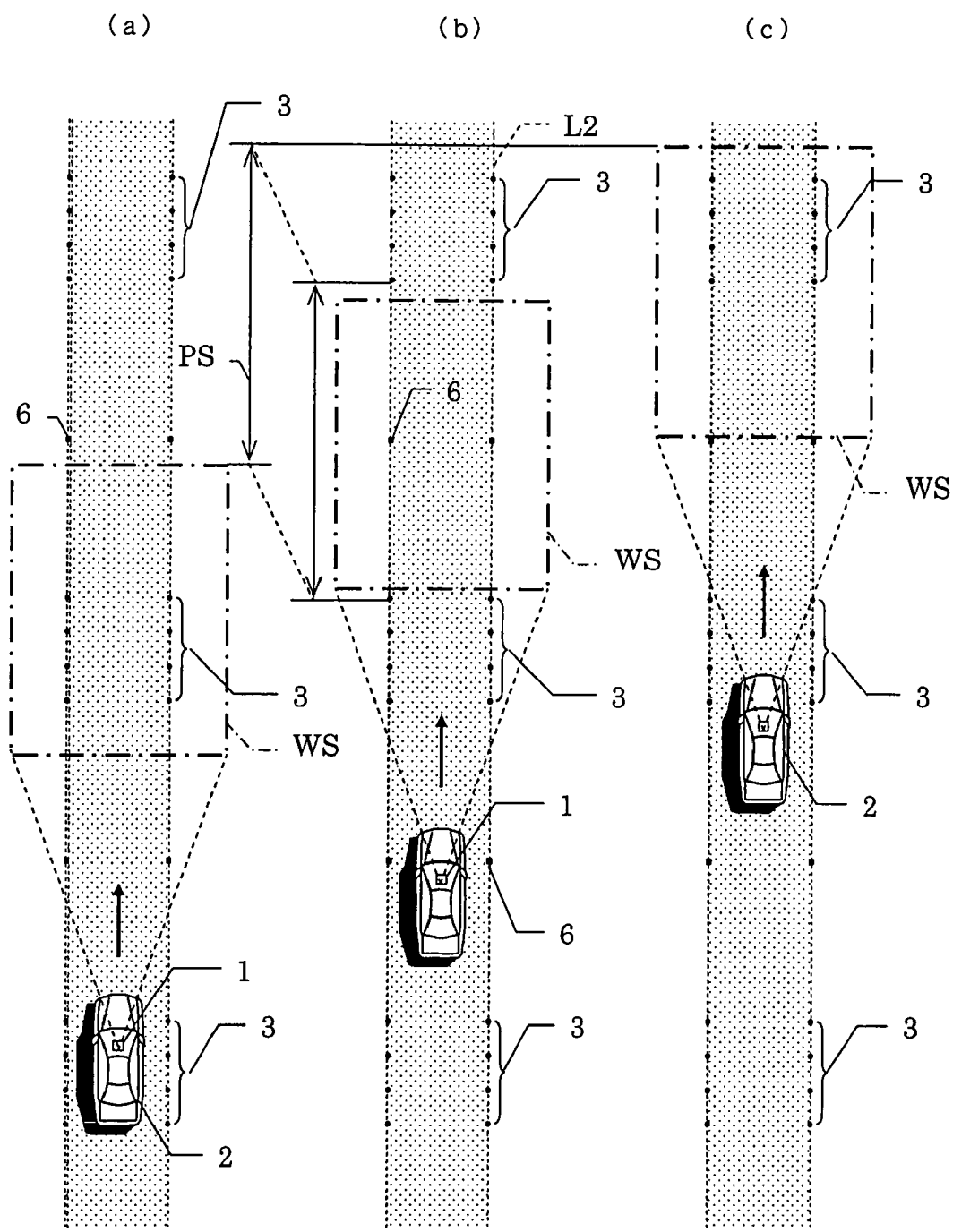
FIG. 14 is a view for illustrating relations between inter-set distances of the lane marking sets and search ranges thereof in an invalidation processing according to the third embodiment of the invention.

Now, referring to FIG. 14, the meaning of the "predetermined period" during which execution of the validation processing of the result of the time-based average processing is continued when the invalidation processing is executed will be elucidated.

FIG. 14 is a view for illustrating the search range WS of the lane markings and shows positional relations among the motor vehicle 2 traveling on a road on which the Botts' dots 3 are laid, the lane markings and the search range WS therefor.

In FIG. 14, change of position of the motor vehicle 2 as a function of time lapse is shown at (a), (b) and (c) in this order.

The lane marking search range WS represents a forward distance range defined as the object for the lane marking search for the image G taken by the camera 1 mounted on the front window of the motor vehicle 2 (see FIG. 2), e.g. the range of 10 [m] in width from a position of 10 [m] to a position of 20 [m] in front of the motor vehicle 2.

Further, the inter-set distance PS of the lane markings (distance between the sets of the Botts' dots 3) is 5.5×2 [m] (=11.0 [m]) except for the isolated reflector 6, as in the case of the example illustrated in FIG. 10 described previously.

Consequently, the search range WS of the lane markings (=10 [m]) is set to be shorter than the inter-set distance PS of the lane markings (=11 [m]) as viewed in the traveling direction of the motor vehicle 2 (refer to arrows).

In that case, there exists the image frame in which the Botts' dots 3 does not exist within the search range WS of the lane markings, as shown at (b) in FIG. 14. In that case, the dot extracted from the search range WS is that of only one reflector 6. Accordingly, the extracted data is rendered invalid.

On the other hand, in the situations shown at (a) and (c) in FIG. 14, one set of Botts' dots 3 (four Botts' dots 3) are contained in the lane marking search range WS.

In this conjunction, it can be appreciated that the inter-vehicle distance between the situations (a) and (c) is equal to the inter-set distance PS of the lane markings.

Accordingly, when execution of the invalidation processing is continued for the predetermined period (corresponding to the time taken for the motor vehicle 2 to cover the distance equal to the lane marking inter-set distance PS), one set of the Botts' dots 3 can be extracted without fail. Thus, the validation processing of the stored information outputted from the time-based average result storing means 36B (or lane recognition result storing means 36) can be terminated to restore the ordinary processing procedure.

As is now apparent, by outputting the result of the preceding time-based average processing (or result of the lane recognition) within the time period whose upper limit is delimited by the time taken for the motor vehicle to cover the lane marking inter-set distance PS, a speedy restoration of the ordinary recognition processing can be realized without impairing the real time performance.

Assuming, by way of example only, that execution of the validation processing of the stored information is continued beyond the predetermined period (i.e., the time taken for the motor vehicle to cover the inter-set distance PS), there may arise such situation that the information stored in the past is maintained effective for an unduly extended time period for the other cause not ascribable to the Botts' dot laying rule (e.g. difficulty in obtaining image because of backlighted shot), whereby the real time performance is degraded, making the vehicle control improper.

Thus, the lane recognition means 30B includes the time-based average processing means 37 for performing the time-based average processing on the result of the lane recognition and the time-based average result storing means 36B for storing the result of the time-based average processing delivered from the time-based average processing means 37. Due to this arrangement, the information stored in the time-based average result storing means 36B is validated when the current information is invalidated by the invalidating means 34B. Thereby, in the case where only one given frame becomes invalid for the lane recognition in the course of the lane recognition, the result of the time-based average processing for which the adverse influence due to the invalid frame is mitigated by the time-based averaging can be outputted even when the result of the preceding lane recognition was erroneous while the result of the erroneous recognition can be prevented from being directly outputted.

Further, when the invalidation processing executed by the invalidating means 34B continues over or beyond a predetermined time, the lane recognizing means 30B allows the validation processing for validating the information stored in the time-based average result storing means 36B to be continued for the predetermined period corresponding or equivalent to the time taken for the motor vehicle 2 to run for the inter-set distance PS of the lane markings while inhibiting the validation processing of the stored information at the time point the predetermined period has elapsed. Thus, even in the case where the invalidation processing is continued over a plurality of frames, the result of the preceding time-based average processing which serves as the reference for the succeeding lane marking search is held for the predetermined period (time taken for the motor vehicle to run for the inter-set distance PS of the lane markings), whereby speedy restoration to the lane recognition processing (ordinary processing) can be realized while ensuring the real time basis.

Many features and advantages of the present invention are apparent from the detailed description and thus it is intended by the appended claims to cover all such features and advantages of the system which fall within the spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

What is claimed is:

1. A lane recognizing image processing system installed on a motor vehicle, comprising:
    image pickup means for picking up scenes appearing in front of said motor vehicle;
    lane marking candidate point extraction means for extracting candidate points of lane markings from an image taken by said image pickup means as lane marking candidate points; and
    lane recognition means for recognizing, on the basis of a set of said lane marking candidate points, a lane on a road on which said motor vehicle is traveling,
    wherein said lane recognition means includes:
    lane marking candidate point position converting means for converting said lane marking candidate points to lane marking candidate point positions,
    wherein said lane marking candidate point position converting means recognizes as said lane marking candidate point positions the positions on a straight line extending in a direction toward a null point onto and along which said lane marking candidate points are converted, and recognizes a midpoint of a lane marking candidate region including said lane marking candidate points as said lane marking candidate point position;
    threshold value setting means for setting a threshold value serving as reference for decision as to validity of said set of the lane marking candidate points; and
    lane marking candidate decision means for extracting paired points from said set of the lane marking candidate points along a direction corresponding to traveling direction of said motor vehicle to thereby make decision as to whether or not the paired points whose inter-point distance exceeds said threshold value exist among said extracted paired points.

2. A lane recognizing image processing system according to claim 1,
    wherein said lane marking candidate decision means is so designed as to decide whether or not the inter-point distance between two points located most distantly from each other as viewed in the traveling direction of said motor vehicle and belonging to said set of the lane marking candidate points exceeds said threshold value.

3. A lane recognizing image processing system according to claim 1,
wherein said threshold value is so set as to be equal to or greater than a lane marking width of said lane marking laid on the road of said motor vehicle and equal to or smaller than an inter-set distance of said lane markings in the traveling direction of said motor vehicle.

4. A lane recognizing image processing system according to claim 1,
wherein said lane recognition means further includes:
invalidating means for invalidating information derived from said lane marking candidate points in the case where said inter-point distance which exceeds said threshold value does not exist.

5. A lane recognizing image processing system according to claim 4,
wherein said lane recognition means includes:
lane recognition result storing means for storing a result of lane recognition processing,
wherein when information is invalidated by said invalidating means, information stored in said lane recognition result storing means is validated.

6. A lane recognizing image processing system according to claim 5,
wherein said lane recognition means is designed such that when invalidation processing executed by said invalidating means continues over or beyond a predetermined time, a validation processing of the stored information held in said lane recognition result storing means is continued for a predetermined period corresponding to a time taken for said motor vehicle to cover said inter-set distance of the lane markings while inhibiting the validation processing of said stored information after lapse of said predetermined period.

7. A lane recognizing image processing system according to claim 4,
wherein said lane recognition means includes:
time-based average processing means for performing a time-based average processing on the result of the lane recognition; and
time-based average result storing means for storing result of time-based average processing delivered from said time-based average processing means,
wherein said information stored in said time-based average result storing means is validated upon invalidation of information by said invalidating means.

8. A lane recognizing image processing system according to claim 7,
wherein said lane recognition means is designed such that when the invalidation processing executed by said invalidating means continues over or beyond a predetermined time, a validation processing of the stored information held in said time-based average result storing means is continued for a predetermined period corresponding to a time taken for said motor vehicle to cover said inter-set distance of the lane markings while inhibiting said validation processing of said stored information after lapse of said predetermined period.

* * * * *